(12) United States Patent
Tarighat Mehrabani

(10) Patent No.: US 10,879,994 B2
(45) Date of Patent: Dec. 29, 2020

(54) REPEATER SYSTEM AND METHOD FOR HIGH-PERFORMANCE COMMUNICATION

(71) Applicant: AR & NS Investment, LLC, Newport Coast, CA (US)

(72) Inventor: Alireza Tarighat Mehrabani, Los Angeles, CA (US)

(73) Assignee: AR & NS Investment, LLC, Newport Coast, CA (US)

( * ) Notice: Subject to any disclaimer, the term of this patent is extended or adjusted under 35 U.S.C. 154(b) by 0 days.

(21) Appl. No.: 16/871,705

(22) Filed: May 11, 2020

(65) Prior Publication Data

US 2020/0358518 A1 Nov. 12, 2020

Related U.S. Application Data

(60) Provisional application No. 62/846,179, filed on May 10, 2019.

(51) Int. Cl.
*H04B 7/155* (2006.01)
*H04B 7/26* (2006.01)
*H04W 16/26* (2009.01)

(52) U.S. Cl.
CPC ..... *H04B 7/15535* (2013.01); *H04B 7/15507* (2013.01); *H04B 7/15542* (2013.01); *H04B 7/15578* (2013.01); *H04B 7/2606* (2013.01); *H04W 16/26* (2013.01)

(58) Field of Classification Search
CPC ............ H04B 7/15535; H04B 7/15507; H04B 7/15542; H04B 7/15578; H04B 7/2606; H04W 16/26
See application file for complete search history.

(56) References Cited

U.S. PATENT DOCUMENTS

| | | | | |
|---|---|---|---|---|
| 5,875,179 A | * | 2/1999 | Tikalsky | H04B 7/269 370/315 |
| 5,898,382 A | * | 4/1999 | Treatch | H04B 7/155 340/2.71 |
| 6,577,176 B1 | * | 6/2003 | Masleid | H03K 5/1252 327/199 |
| 2002/0133758 A1 | * | 9/2002 | Quan | G06F 12/0811 714/51 |
| 2009/0129496 A1 | * | 5/2009 | Zhang | H04B 7/2606 375/262 |
| 2011/0223855 A1 | * | 9/2011 | Frenger | H04W 52/46 455/9 |

(Continued)

*Primary Examiner* — Dominic E Rego
(74) *Attorney, Agent, or Firm* — Chip Law Group

(57) ABSTRACT

A repeater system includes a first repeater device to receive a first beam of radio frequency (RF) signal from a first network node, and a second repeater device to receive a second beam of RF signal from the first network node. The first repeater device synchronizes and controls the second repeater device to concurrently provide the first beam and the second beam of RF signal to a second network node. A plurality of measurements associated with network nodes and repeater devices is acquired. A plurality of signal parameters is selected at the first and second repeater devices for a first beam and a second beam of RF signal, respectively, such that a cross-leakage of first beam on the second beam of RF signal and vice-versa at the second network node is reduced and the gain and a phase of first beam and the second beam of RF signal is adjusted.

20 Claims, 16 Drawing Sheets

(56) References Cited

U.S. PATENT DOCUMENTS

| | | | | |
|---|---|---|---|---|
| 2012/0264369 A1* | 10/2012 | Wang | ............... | H04B 7/15528 |
| | | | | 455/11.1 |
| 2014/0333434 A1* | 11/2014 | Kates | ............... | H04Q 9/00 |
| | | | | 340/539.22 |
| 2016/0057720 A1* | 2/2016 | Kim | ............... | H04L 5/0048 |
| | | | | 370/350 |
| 2018/0139627 A1* | 5/2018 | Ashworth | ............... | H04B 7/15535 |

\* cited by examiner

REPEATER SYSTEM AND METHOD FOR HIGH-PERFORMANCE COMMUNICATION

CROSS-REFERENCE TO RELATED APPLICATIONS/INCORPORATION BY REFERENCE

This Application makes reference to, claims priority to, and claims benefit from U.S. Provisional Application Ser. No. 62/846,179, which was filed on May 10, 2019. The above referenced Application is hereby incorporated herein by reference in its entirety.

FIELD OF TECHNOLOGY

Certain embodiments of the disclosure relate to communication systems. More specifically, certain embodiments of the disclosure relate to a repeater system and a method for high-performance communication, for example, data communication.

BACKGROUND

Wireless telecommunication in modern times has witnessed advent of various signal transmission techniques and methods, such as use of beam forming and beam steering techniques, for enhancing capacity of radio channels. In accordance with such techniques, a transmitter radiates radio waves in form of beams of radio frequency (RF) signals to a variety of RF receiver devices. The conventional systems which use techniques such as beamforming and beam steering for signal transmission may have one or more limitations. For example, a beam of RF signals transmitted by conventional systems, may be highly directional in nature and may be limited in transmission range or coverage.

In certain scenarios, an RF receiver device may be situated at a distance which is beyond transmission range of the transmitter, and hence reception of the RF signal at the RF receiver device may be adversely affected. In other scenarios one or more obstructions (such as buildings and hills) in path of the RF beam transmitted by the transmitter, may be blocking reception of the RF signal at the RF receiver device. For the advanced high-performance communication networks, such as the millimeter wave communication system, there is required a dynamic system that can overcome the one or more limitations of conventional systems. Moreover, the number of end-user devices, such as wireless sensors and IoT devices are rapidly increasing with the increase in smart homes, smart offices, enterprises, etc. Existing communication systems are unable to handle such massive number of wireless sensors and IoT devices and their quality-of-service (QoS) requirements. In such cases, it is extremely difficult and technically challenging to support these end user devices in order to meet data communication in multi-gigabit data rate. Moreover, latency and unreliable data communication resulting in erroneous data recovery at the destination node are other technical problem with existing communication systems and network architecture.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A repeater system and methods for high-performance communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a repeater system and method for high-performance communication, for example, data communication. The repeater system and method of the present disclosure not only improves data transfer rates between at least two network nodes as compared to existing wireless communication systems (e.g. a cellular network or other wireless networks), but also enables almost near zero latency communication and an always-connected experience. The repeater system may deploy a plurality of repeater devices, which may be configured to perform distributed multiple-input multiple-output (MIMO) operations, and enhance the wireless communication capacity, coverage, and reliability between a source network node and a destination network node, for high-performance communication. In the following description, reference is made to the accompanying drawings, which form a part hereof, and in which is shown, by way of illustration, various embodiments of the present disclosure.

Figure 1:
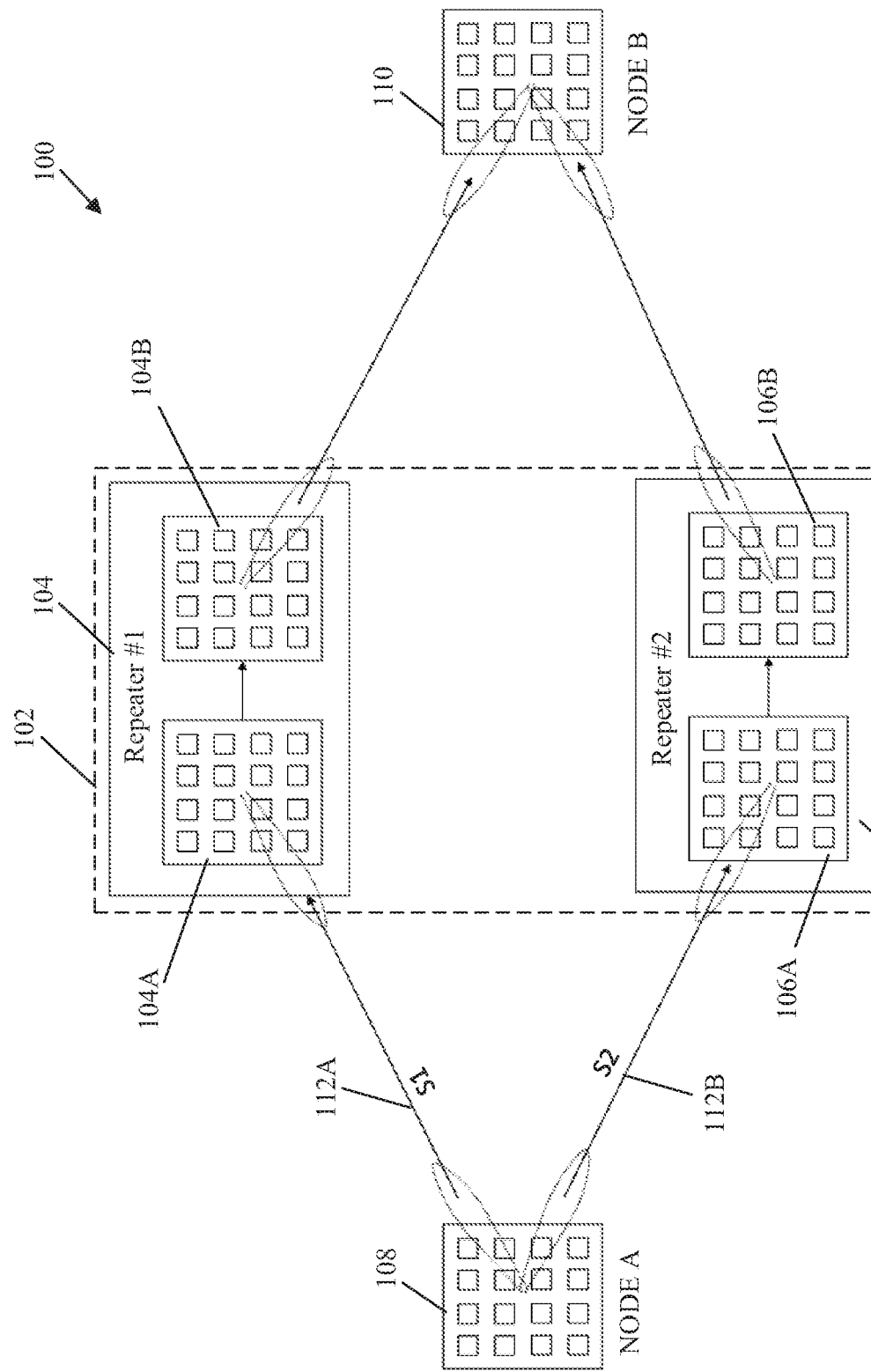
FIG. 1 is a network environment of a communication system with a repeater system, in accordance with an exemplary embodiment of the disclosure.

FIG. 1 is a network environment of a communication system with a repeater system, in accordance with an exemplary embodiment of the disclosure. With reference to FIG. 1, there is shown a communication system 100 that may include a repeater system 102. The repeater system 102 may include a plurality of repeater devices, such as a first repeater device 104 and a second repeater device 106. In this embodiment, the first repeater device 104 may include a first receiving antenna array 104A and a first transmitting antenna array 104B. The second repeater device 106 may include a second receiving antenna array 106A and a second transmitting antenna array 106B. The communication system 100 may further include a first network node 108 (e.g. Node A) and a second network node 110 (e.g. Node B).

The repeater system 102 may include a plurality of repeater devices, such as the first repeater device 104 deployed at a first location and the second repeater device 106 deployed at a second location. Each of the plurality of repeater devices, such as the first repeater device 104 and the second repeater device 106, includes suitable logic, circuitry, and interfaces that may be configured to communicate with the first network node 104 (i.e. the Node A) and the second network node 106 (i.e. the Node B). The repeater system 102 enables data communication in a multi-gigabit data rate. In accordance with an embodiment, the repeater system 102 may support multiple and a wide range of frequency spectrum, for example, 1G, 2G, 3G, 4G, and 5G (including out-of-band frequencies). Examples of the each of the plurality of repeater devices of the repeater system 102 may include, but is not limited to, a 5G wireless access point, a multiprotocol wireless range extender device, an evolved-universal terrestrial radio access-new radio (NR) dual connectivity (EN-DC) device, a NR-enabled repeater device, a wireless local area network (WLAN)-enabled device, or a wireless personal area network (WPAN)-enabled device, a MIMO-capable repeater device, or a combination thereof.

The first network node 108 (e.g. Node A) refers to a source network node. Examples of the first network node 108 may include, but is not limited to, a base station (e.g. an Evolved Node B (eNB) or gNB), a small cell, a remote radio unit (RRU), or other network nodes or communication device provided in a network.

The second network node 110 (e.g. Node B) refers to a destination network node. Examples of the second network node 110 may include, but is not limited to, a smartphone, a customer-premises equipment (CPE), a wireless modem, a user equipment, a virtual reality (VR) headset, an augmented reality (AR) device, an in-vehicle device, a home router, a cable or satellite television set-top box, a VoIP base station, or any other customized hardware for telecommunication.

In operation, the communication system 100 may employ the repeater system 102 to execute a distributed MIMO communication over the plurality of repeater devices, such as the first network node 108 (i.e. the node A or the source) and the second network node 110 (i.e. the node B or the destination). In some embodiments, the plurality of repeater devices of the repeater system 102 may be used for transporting data between the first network node 108 (i.e. the node A) and the second network node 110 (i.e. the node B). As shown in the FIG. 1, the plurality of repeater devices of the repeater system 102 may be deployed and configured to enhance the wireless communication capacity, coverage, reliability between the between the first network node 108 (i.e. the node A) and the second network node 110 (i.e. the node B).

The first repeater device 104 may be configured to receive a first beam of radio frequency (RF) signal from the first network node 108 (i.e. the node A) via a first communication path. The first beam of RF signal may carry a first data stream 112A (also represented as S1) transmitted by the first network node 108. The second repeater device 106 may be configured to receive a second beam of RF signal from the first network node 108 via a second communication path. The second beam of RF signal may carry a second data stream 112B (also represented as S2) transmitted by the first network node 108 (same Node A). The first repeater device 104 may be a master repeater device. The first repeater device 104 may be further configured to synchronize and control the second repeater device 106 to concurrently provide the first beam of RF signal and the second beam of RF signal to the second network node 110 (i.e. the node B). Alternative stated, as a general mode of operation, the first network node 108 (i.e. the Node A) may be configured to deploy multiple beams of RF signals with multiple streams transported over such beams. Each beam of RF signal may be picked up by a repeater device (e.g. the first repeater device 104 through a receiver antenna array), amplified, and re-transported through a different antenna array that communicates the beam of RF signal towards the second network node 110 (i.e. the node B). For example, the first receiving antenna array 104A may be configured to receive the first beam of RF signal carrying the first data stream 112A (S1) from the first network node 108 (i.e. the node A) and re-transmit the first beam of RF signal carrying the first data stream 112A through the first transmitting antenna array 104B to the second network node 110 (i.e. the node B). Similarly, the second receiving antenna array 106A may be configured to receive the second beam of RF signal carrying the second data stream 112B (S2) from the first network node 108 (i.e. the node A) and re-transmit the second beam of RF signal carrying the second data stream 112B through the second transmitting antenna array 106B to the second network node 110 (i.e. a common destination, node B). The second network node 110 (i.e. node B) may be configured to concurrently receive the first beam of RF signal and the second beam of RF signal from different repeater devices of the repeater system 102. In other words, at the second network node 110 (i.e. node B), multiple beams of RF signals may be received from the first repeater device 104 and the second repeater device 106 (i.e. repeaters #1 and #2) concurrently. These received signals may then be jointly or independently processed to recover the original data streams (S1 and S2).

In accordance with an embodiment, one or more implementations may be jointly or separately supported by the communication system 100. For example, in a first implementation, spatial diversity with distinguished beams may be performed. In order to achieve spatial diversity, the first data stream 112A (i.e. S1) and the second data stream 112B (i.e. S2) may be identical. By communicating identical data streams via the first communication path and the second communication path, spatial diversity is achieved, which in turn improves the reliability and robustness of a link between the first network node 108 (i.e. the node A) and the second network node 110 (i.e. node B). In this case, the second network node 110 (i.e. node B) receives the same data stream through two different communication paths and via two repeater devices (i.e. the first repeater device 104 and the second repeater device 106). In this embodiment, the second network node 110 (i.e. node B) may be configured to utilize two different beams for receiving signals from the first repeater device 104 and the second repeater device 106. The second network node 110 (i.e. node B) may be further configured to a) use a strongest signal received (e.g. the first beam of RF signal carrying the first data stream 112A) and discard the second received copy (copy of data stream S1) that has comparatively less strength; b) use maximal or equalized combining of two received copies through different communication paths and different repeater devices for improved effective signal-to-noise-ratio (SNR).

In a second implementation, spatial diversity may be achieved with a common beam. In this case, the first network node 108 (i.e. the node A) may be configured to transport data streams S1 and S2 (same data) to the first repeater device 104 and the second repeater device 106 (i.e. repeaters #1 and #2), using a common single beam of RF signal. For example, the first network node 108 (i.e. the node A) may be configured to utilize a single wide beam for transporting same data streams to first repeater device 104 and the second repeater device 106. In this case, a single beam generated by the first network node 108 (i.e. the node A) may be sufficient to transport same stream through both repeaters #1 and #2 (i.e. the first repeater device 104 and the second repeater device 106) to achieve the spatial diversity.

In a third implementation, spatial multiplexing may be executed with non-overlapping beams. In this case, the first data stream 112A (S1) may be different from the second data stream 112B (S2). In other words, the data streams 1 and 2 (S1 and S2) may be independent streams containing independent information bits. In this case, the beams (i.e. the first beam and the second beam of RF signals) used at the first network node 108 (i.e. the node A) to transmit these streams may be non-overlapping. Non-overlapping is defined in this context as follows: the cross-leakage or cross-interference between the two beams would be better than the required SNR for recovering these streams at the second network node 110 (i.e. node B). Similarly, the beams the second network node 110 (i.e. node B) for receiving these two streams would be non-overlapping. As a result, the final streams recovered at the second network node 110 (i.e. node B) may have cross-leakage between data streams S1 and S2 that is better than SNR required for decoding data streams S1 and S2. As a results, no special processing or MIMO coding may be required to resolve and recover streams S1 and S2.

In a fourth implementation, spatial multiplexing may be achieved with interference pre-compensation at transmitter (i.e. the first network node 108, the node A). In this implementation, the first data stream 112A (S1) may be different from the second data stream 112B (S2), i.e., data streams S1 and S2 may be formed to contain independent data. However, given an existence of effective cross channel leakage (in the form of gain/phase) between the first network node 108 (i.e. node A) and the second network node 110 (i.e. node B) (through repeaters #1 and #2), a pre-compensation processing is applied at first network node 108 (i.e. node A) on data streams S1 and S2, before they are fed into the two beams (i.e. the first beam and the second beam). This pre-compensation may be designed to compensate for the small cross-leakage between the streams as they travel through two repeater paths of the repeater system 102. For example, the data streams S1 and S2, may be passed through a 2×2 matrix operation to generate S1' and S2', such that the 2×2 matrix operation, cancels for the 2×2 cross leakage matrix between the streams S1 and S2 (such as cross leakage due to overlap between the beams, i.e., the first beam of RF signal and the second beam of RF signal).

In a fifth implementation, spatial multiplexing may be achieved with interference compensation at a receiver (i.e. the second network node 110, the node B). In this implementation too, the first data stream 112A (S1) may be different from the second data stream 112B (S2), i.e., data streams S1 and S2 may be formed to contain independent data. However, given an existence of effective cross channel leakage (in the form of gain/phase) between first network node 108 (i.e. node A) and second network node 110 (i.e. node B) (through repeaters #1 and #2), a post-compensation processing (e.g. interference cancellation) may be applied at second network node 110 (i.e. node B) on received streams (e.g. R1 corresponding to S1, and R2 corresponding to S2), before they are demodulated to recover original data streams S1 and S2. This post-compensation at the second network node 110 (i.e. node B), may be configured to compensate for a small cross-leakage between the data streams S1 and S2 as they travel through two repeater paths. For example, the received streams R1 and R2, may be passed through a 2×2 matrix operation to generate S1' and S2', such that this 2×2 matrix operation, cancels for the 2×2 cross leakage matrix between the streams R1 and R2 (such as cross leakage due to overlap between the beams).

In a sixth implementation, MIMO processing may be executed, for example, at the first network node 108. In this implementation, the streams S1 and S2 (i.e. the the first data stream 112A and the second data stream 112B) transmitted by first network node 108 (i.e. node A) (towards the first repeater device 104 and the second repeater device 106) may be outcome of two original data streams (e.g. S1_0 and S2_0) after the MIMO processing is applied on them. In other words, the original data streams S1_0 and S2_0 may undergo a MIMO processing operation. One such example for MIMO processing is processing of [S1_0 S2_0] by unitary matrix U, where U is result of singular-value decomposition of channel matrix H=U×L×V', where H is the propagation channel that is diagonalized by unitary matrices U and V, where L is a diagonal matrix composed of channel singular values or Eigen-values. The outcome of this processing, i.e., [S1 S2], may then be transmitted over-the-air. This mode of operation is selected when the off-diagonal elements in channel matrix H are comparable to the diagonal elements, and the MIMO processing provides MIMO capacity gain.

It is to be understood by a person of ordinary skill in the art that with no loss of generality, other known MIMO techniques and computations may be applied on streams [S1_0 S2_0] to generate [S1 S2] streams transmitted over-the-air. In an example, a space-time coded streams S1 and S2 may be used for MIMO processing, in which original streams [S1_0 S2_0] undergo space-time coding procedure to generate streams [S1 S2] to be transmitted over-the-air. A space-time coding mode may be utilized to provide robustness and diversity protection, without significant penalty in channel capacity. Examples of the coding used in this case may include, but is not limited to an orthogonal space time blocks codes (O-STBC) and Alamouti coding. Moreover, with no loss of generality, the aforementioned implementations, may be applied to various modulations. For example, the aforementioned implementations may be applied to single-carrier (SC) modulations as well as multi-carrier modulations. In the case of multi-carrier modulations (such as OFDM, OFDMA, and SC-FDMA), the above MIMO processing and operations may be applied equally to all subcarriers, or be applied differently per sub-carrier (e.g., different matrix values per subcarrier).

For the sake of brevity, the aforementioned implementations (and embodiments) are described with two repeaters in the repeater system 102 and two data streams S1 and S2. However, it is to be understood by a person of ordinary skill in the art that such implementations and embodiments can be extended to cover cases of N beams/streams transmitted out of first network node 108 (i.e. node A), and N repeaters utilized in the network environment, and second network node 110 (i.e. node B), using P beams for receiving signals from the N repeaters.

In another aspect of the present disclosure, the repeater system 102 may be configured to use a plurality of phased antenna arrays, which may be configured to receive signals from a plurality of source devices (instead of one network node) and re-transmit the received signals to a plurality of destination devices. In a first example, the first repeater device 104 may use a single antenna array, which may be configured to receive and transmit multiples beams and/or streams through the same antenna array. In this case, the first repeater device 104 may receive streams/beams from a plurality of source devices, concurrently, while re-transmitting those streams through a plurality of beams to the plurality of destination devices. In some embodiments, the first repeater device 104 may be configured to receive data streams from a single source node (i.e. the first network node 108), while re-transmitting signals to multiple destination devices. In another embodiment, the first repeater device 104 may be configured to receive data streams S1 and S2 from multiple source devices (where these streams may contain the same information bits, or independent information bits) and re-transmit these streams to a single destination device, such as the second network node 110.

In another example, the first repeater device 104 may use different physical antenna arrays in order to receive and transmit beams/streams. Some antenna arrays may be used for transmitting data streams/beams, while other antenna arrays may be utilized for receiving data streams/beams. The first repeater device 104 may be configured to operate in: (1) time-division duplex mode (TDD), where the first repeater device 104 is configured to relay or repeat signals from the first network node 108 (i.e. node A) to second network node 110 (i.e. node B) in T1 time interval, and the first repeater device 104 is reconfigured to relay or repeat signals from second network node 110 (i.e. node B) to first network node 108 (i.e. node A) in T2 time interval. The first repeater device 104 may be further configured to operate in: 2) frequency-division duplex mode (FDD), where bi-directional links may be concurrently operating in different frequency channels. The first repeater device 104 may be further configured to operate in: 3) full-duplex mode (FD), where a repeater device (such as the first repeater device 104) may be configured to relay or repeat the signals between the first network node 108 (i.e. node A) and the second network node 110 (i.e. node B), concurrently, in both direction, irrespective of presence of signals or not.

In another example, for each link direction, the first repeater device 104 may include the first receiving antenna array 104A that is configured to receive the first beam of RF signal from the first network node 108 (i.e. node A), and the first transmitting array 104B that is configured to transmit the first beam of RF signal carrying first data stream 112A to the second network node 110 (i.e. node B). In this case, the RF signal exchange between these two antenna arrays may be: 1) in original RF frequency, where no frequency shift is applied to the signal; 2) in some intermediate frequency (IF) where the signal is shifted down to IF frequency before being routed from first receiving antenna array 104A to the first transmitting antenna array 104B; 3) in baseband I/O domain, where the signal is down-converted (shifted in frequency) to zero frequency before being routed from first receiving antenna array 104A to the first transmitting antenna array 104B; or 4) in digital domain, where the received signal is shifted down in frequency domain and digitized before being routed to the first transmitting antenna array 104B.

In some embodiments, each repeater device (such as the first repeater device 104 and/or the second repeater device 106) may not perform any decoding of received stream before re-transmitting it. This mode may be utilized when very low latency link is desired or required. In this embodiment, the received signal passing through a receiving antenna array (such as first receiving antenna array 104A) may be shifted in frequency, amplified, filtered for out of channel noise, and transmitted at RF frequency through a transmitting antenna array (such as the first transmitting antenna array 104B) configured to a certain beam pattern. In some embodiments, each repeater device (such as the first repeater device 104 and/or the second repeater device 106) may digitize the received stream for some low-latency processing in the digital domain (such as channel selection filtering, IQ correction), without demodulating the data stream. In some embodiments, where latency of demodulation and re-modulation of data stream can be afforded (i.e. acceptable), and/or the quality (i.e. the SNR) of the received stream is not sufficient for re-transmission as is, the repeater device (such as the first repeater device 104 and/or the second repeater device 106) may de-modulate, de-code, re-encode, re-modulate the stream before re-transmitting the stream through a transmitting antenna array (such as the first transmitting antenna array 104B).

In some embodiments, the receiving antenna array (e.g. the first receiving antenna array 104A or the second receiving antenna array 106A) and transmitting antenna array (e.g. the first transmitting antenna array 1048 or the second transmitting antenna array 1068) inside a repeater device (e.g. the first repeater device 104 or the second repeater device 106) operate at the same carrier RF frequency. In this case, no frequency shift is applied/observed between the incoming signal compared to the outgoing signal. In some embodiments, the carrier RF frequency of incoming and outgoing signals may be different. This embodiment may be utilized, for 1) better utilization of spectral channels, 2) better overall frequency planning in network, 3) better isolation between the two antenna arrays inside the repeater device operating at same time/channel. In some embodiments, the antenna arrays in a repeater device of the repeater system 102 may deploy classic phase shifters per antenna element to create configurable or programmable antenna radiation patterns. In some embodiments, the antenna arrays may be implemented by other means of creating programmable phase shifts in RF signals per group of radiating elements of a given antenna array. In some embodiments, digital domain computations (e.g. complex multipliers (certain amplitude and certain phase of a signal) or true delay line implementations per radiating element may be deployed to produce directional and/or configurable radiation patterns.

In accordance with an embodiment, the repeater system 102 may be configured to perform beam pattern configuration. Each antenna array (either transmitting or receiving) within a repeater device (e.g. the first repeater device 104 or the second repeater device 106) may be further configured to select and form a radiation pattern from a plurality of possible beam patterns. In the case of concurrent multi-beam mode of operation, each beam can be configured independently. Several approach may be used for selecting the beam configurations for various links in/out of each repeater device of the repeater system 102. In a first approach, a localized beam configuration selection may be employed, in which a repeater device (e.g. the first repeater device 104 or the second repeater device 106) may implement operations self-contained within the repeater device to determine what beam configurations to use. For example, the first repeater device 104 may be configured to measure SNR or received signal power to select the best beam configuration when receiving a signal from the source device, such as the first network node 108.

In a second approach, link level beam configuration selection may be employed, in which a repeater device (e.g. the first repeater device 104 or the second repeater device 106) may be configured to use the link between the repeater device and one of the first network node 108 (i.e. node A) or the second network node 110 (i.e. node B) to train its beam selection for its receiving or transmitting array. For example, to select a beam configuration for the first transmitting phase array 104B of the first repeater device 104 towards the first network node 108 (i.e. node A), the first repeater device 104 may be configured to use one or more link metric measurements (such as SNR or received signal power) by the first network node 108 (i.e. node A) to configure the beam of the first transmitting antenna array 104B of the first repeater device 104. In an implementation, the communication and exchange of measurements between each repeater device (e.g. the first repeater device 104 or the second repeater device 106) of the repeater system 102 and the first network node 108 (i.e. node A) may be done using an out-of-band or an auxiliary link. For example, a Wi-Fi link or a Long-term Evolution (LTE) link may be used for coordination and exchange of messages between each repeater device and the first network node 108 (i.e. node A). In another implementation, the exchange of measurements and training of beam selection process may be done using in-band communication (i.e. the same target link that is used for data transport between each repeater device of the repeater system 102 and the first network node 108 (i.e. node A), is also used for training and selection of beam configuration).

In a third approach, a network level beam configuration selection may be performed, in which a master network node (e.g. a base station in the case of a cellular network, or a server in the cloud network) may be configured to acquire various information elements from the various network nodes in the network, and use all such data to select the beam configurations for different nodes and repeater devices of the repeater system 102 in the network. For example, the first network node 108 (i.e. node A) may be configured to acquire measurement data from the first repeater device 104, the second repeater device 106, and the second network node 110 (i.e. node B), and other possible destination nodes in the network. Thereafter, the first network node 108 (i.e. node A) may be configured to process all acquired measurements jointly, and instruct the network nodes and the repeaters devices of the repeater system 102 in the network to use the selected beam configurations, respectively.

Figure 2:
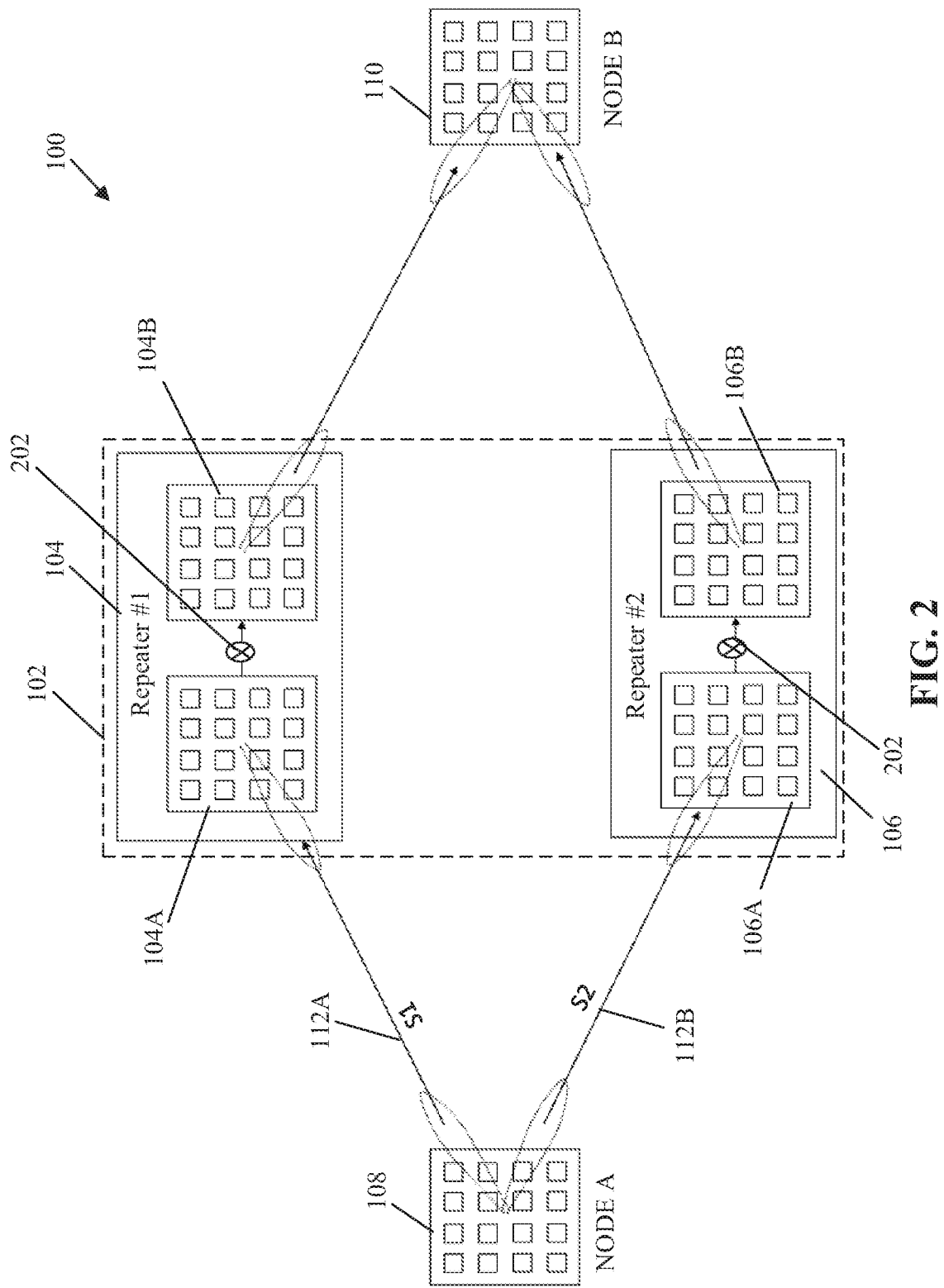
FIG. 2 is a network environment of a communication system with a repeater system with gain and phase control, in accordance with an exemplary embodiment of the disclosure.

FIG. 2 is a network environment of a communication system with a repeater system with gain and phase control, in accordance with another exemplary embodiment of the disclosure. FIG. 2 is explained in conjunction with elements from FIG. 1. With reference to FIG. 2, there is shown the communication system 100 that may include the repeater system 102. In this embodiment, each of the first repeater device 104 and the second repeater device 106 of the repeater system 102 may be configured to execute a gain and phase control operation 202.

The first repeater device 104 may be configured to receive the first beam of radio frequency (RF) signal from the first network node 108 (i.e. the node A) via a first communication path. The first beam of RF signal may carry a first data stream 112A (also represented as S1) transmitted by the first network node 108. The second repeater device 106 may be configured to receive a second beam of RF signal from the first network node 108 via a second communication path. The second beam of RF signal may carry a second data stream 112B (also represented as S2) transmitted by the first network node 108 (same Node A). The first repeater device 104 may be a master repeater device and may be further configured to synchronize and control the second repeater device 106 to concurrently provide the first beam of RF signal and the second beam of RF signal to the second network node 110 (i.e. the node B). In other words, the first data stream 112A and the second data stream 112B (S1 and S2) may be concurrently communicated to the second network node 110 by the first network node 108 via the two repeater devices of the repeater system 102 to achieve distributed MIMO for enhanced communication reliability.

The first repeater device 104 (e.g. set as the master repeater device) may be further configured to control the second repeater device 106 to acquire a plurality of measurements associated with each of the first network node 108, the second network node 110, the first repeater device 104, and the second repeater device 106. The plurality of measurements may be exchanged between the network nodes (e.g. the first network node 108 and the second network node 110) and repeater devices of the repeater system 102 so that one master repeater device, such as the first repeater device 104 (with access to all such measurements) may process and select certain values (e.g. optimal values and communicate back those selected values to respective repeaters, such as the second repeater device 106). The plurality of measurements comprises a signal-to-noise ratio (SNR) of the first beam of RF signal and the second beam of RF signal at the second network node 110 (i.e. node B), a channel impulse response corresponding to the first beam of RF signal and the second beam of RF signal at the second network node 110, a cross-leakage between the first beam of RF signal and the second beam of RF signal measured at the second network node 110, an absolute signal power corresponding to the first beam of RF signal and the second beam of RF signal at the second network node 110, required SNR values depending on a modulation-coding-scheme used for the first beam of RF signal and the second beam of RF signal, a first SNR value for the first beam of RF signal received at the first repeater device 104, and a second SNR value for second beam of RF signal received at the second repeater device 106. In an implementation, the plurality of measurements may be acquired based on in-band communication between the first repeater device 104 and each of the first network node 108, the second network node 110, and the second repeater device 106. In another implementation, the plurality of measurements may be acquired based on out-of-band communication between the first repeater device 104 and each of the first network node 108, the second network node 110, and the second repeater device 106.

The first repeater device 104 may be further configured to control the second repeater device 106 to select a plurality of signal parameters at the first repeater device 104 and the second repeater device 106 for the first beam of RF signal and the second beam of RF signal respectively, based on the acquired plurality of measurements such that a cross-leakage of the first beam of RF signal on the second beam of RF signal and vice-versa at the second network node 110 is reduced. Moreover, the first repeater device 104 may be further configured to control the second repeater device 106 to adjust a gain and a phase of the first beam of RF signal and the second beam of RF signal based on the selected plurality of signal parameters such that a concurrent recovery of data from the first beam of RF signal and the second beam of RF signal is achieved at the second network node 110. As shown in FIG. 2, the gain and phase control operation 202 may be executed at each repeater device (such as the first repeater device 104 and the second repeater device 106) of the repeater system 102.

In accordance with an embodiment, in the gain and phase control operation 202, the gain and phase of a signal passing through the repeater #1 and repeater #2 (i.e. the first repeater device 104 and the second repeater device 106) may be adjusted (or modified) through expressions $a_1 * \exp(j * phi_1)$ and $a_2 * \exp(j * phi_2)$, where $a_1$ corresponds to first amplitude value for the first beam, "exp" corresponds to exponential, and $phi_1$ corresponds to phase of the signal passing through the first repeater device 104. Similarly, $a_2$ corresponds to second amplitude value for the second beam, exp corresponds to exponential, and $phi_2$ corresponds to phase of the signal (second beam) passing through the second repeater device 106. These configurations and values (or coefficients) correspond to the plurality of signal parameters, which are selected to optimize the overall performance at the second network node 110 (i.e. node B), where data (i.e. both data streams S1 and S2) is recovered concurrently. Each signal parameter (i.e. selected values) may control and adjust the overall gain and phase of the signal being retransmitted by each repeater device (i.e. the first repeater device 104 and the second repeater device 106). In some embodiments, the values of $a_1$ and $a_2$ are set such that cross leakage of data stream S1 on S2 (and vice versa) at second network node 110 (i.e. node B) (specifically, a receiving array) are mutually minimized. For example, assume, the absolute power of received signal at second network node 110 (i.e. node B) corresponding to steam S1 through the first first repeater device 104 (i.e. repeater #1) is 10 dB higher than the corresponding signal power level of data stream S2, coming through the second repeater device 106 (i.e. the repeater #2). In this case, the higher power level of data stream S1 (i.e. the first beam of RF signal carrying the first data stream 112A, S1) may negatively impact decoding of stream S2 (due to residual leakage). In this case, equalizing of power levels of signals corresponding to data streams S1 and S2 at second network node 110 (i.e. node B), may be utilized by settings $a_1$ and $a_2$ values accordingly. In some embodiments, the relative values of these gain stages may be selected depending on the SNR requirements of the data streams S1 and S2. For example, if stream S1 is using 16 quadrature amplitude modulation (16QAM), while stream S2 is using Quadrature Phase Shift Keying (QPSK), the data stream S2 may require lower SNR than data stream S1 for successful recovery of the original streams. In this case, the values of $a_1$ and $a_2$ are set such that the power of final received signal corresponding to data stream S1 is higher than that of data stream S2 (e.g., the final received power may be configured to be 6 dB higher for received signals corresponding to data stream S1 compared to data stream S2).

In accordance with an embodiment, a state machine (and routines) for selecting the values for $a_1 * \exp(j * phi_1)$ and $a_2 * \exp(j * phi_2)$, may reside within repeaters #1 and #2 (i.e. the first repeater device 104 and the second repeater device 106), or may reside in one of first network node 108 and the second network node 110 (i.e. nodes A or B), or may reside in a remote server (e.g. a cloud-based server). In an example, regarding measurements used for deciding optimal values of $a_1 * \exp(j * phi_1)$ and $a_2 * \exp(j * phi_2)$, in some embodiments, such measurements may include: received SNR of the streams S1 and S2 at second network node 110 (i.e. node B), channel impulse response corresponding to the data streams S1 and S2 received at second network node 110 (i.e. node B), cross leakage between the data stream S1 and S2 measured at second network node 110 (i.e. node B), absolute signal power (received signal strength indicator, or RSSI) corresponding to the data streams S1 and S2 at second network node 110 (i.e. node B), required SNR values given the modulation-coding-scheme (MCS) used for the data streams S1 and S2, receiver SNR of the data stream S1 measured at repeater #1 (i.e. the first repeater device 104), receiver SNR of the data stream S2 measured at repeater #2 (i.e. the second repeater device 106).

In accordance with an embodiment, the first beam of RF signal carrying a first data stream is received from the first network node 108 in a first polarization type and re-transmitted to the second network node 110 in a second polarization type that is different than the first polarization type. The second beam of RF signal carrying a second data stream is received from the first network node 108 in a first polarization type and re-transmitted to the second network node 110 in a second polarization type that is different than the first polarization type. The first polarization type and second polarization type may refer to a horizontal polarization and a vertical polarization.

In accordance with an embodiment, the first repeater device 104 may be further configured to establish an additional link with the second repeater device 106 by which a first data stream carried by the first beam of RF signal may be provided to the second network node 110 through the first repeater device 104 as well as the second repeater device 106, and a second data stream carried by the second beam of RF signal may be further provided to the second network node 110 concurrent to the first data stream via the second repeater device 106. An example of the establishment of the additional link is further described in detail, for example, in FIG. 7.

In accordance with an embodiment, the first repeater device 104 and the second repeater device 106 may be mounted on a vehicle, where the first repeater device 104 (in synchronization to the second repeater device 106), may be further configured to select one or more beamforming schemes to illuminate space inside the vehicle such that both an uplink and a downlink communication is established between the first network node 108 and a user device corresponding to the second network node present within the vehicle. At least one of the first repeater device 104 and the second repeater device 106 may be further configured to be activated or deactivated based on a visibility status to the first network node 108 when the vehicle in in motion. The implementation of the repeater system 102 in a vehicle and the activation or deactivation based on the visibility status is further described in detail, for example, in FIG. 8.

Figure 3:
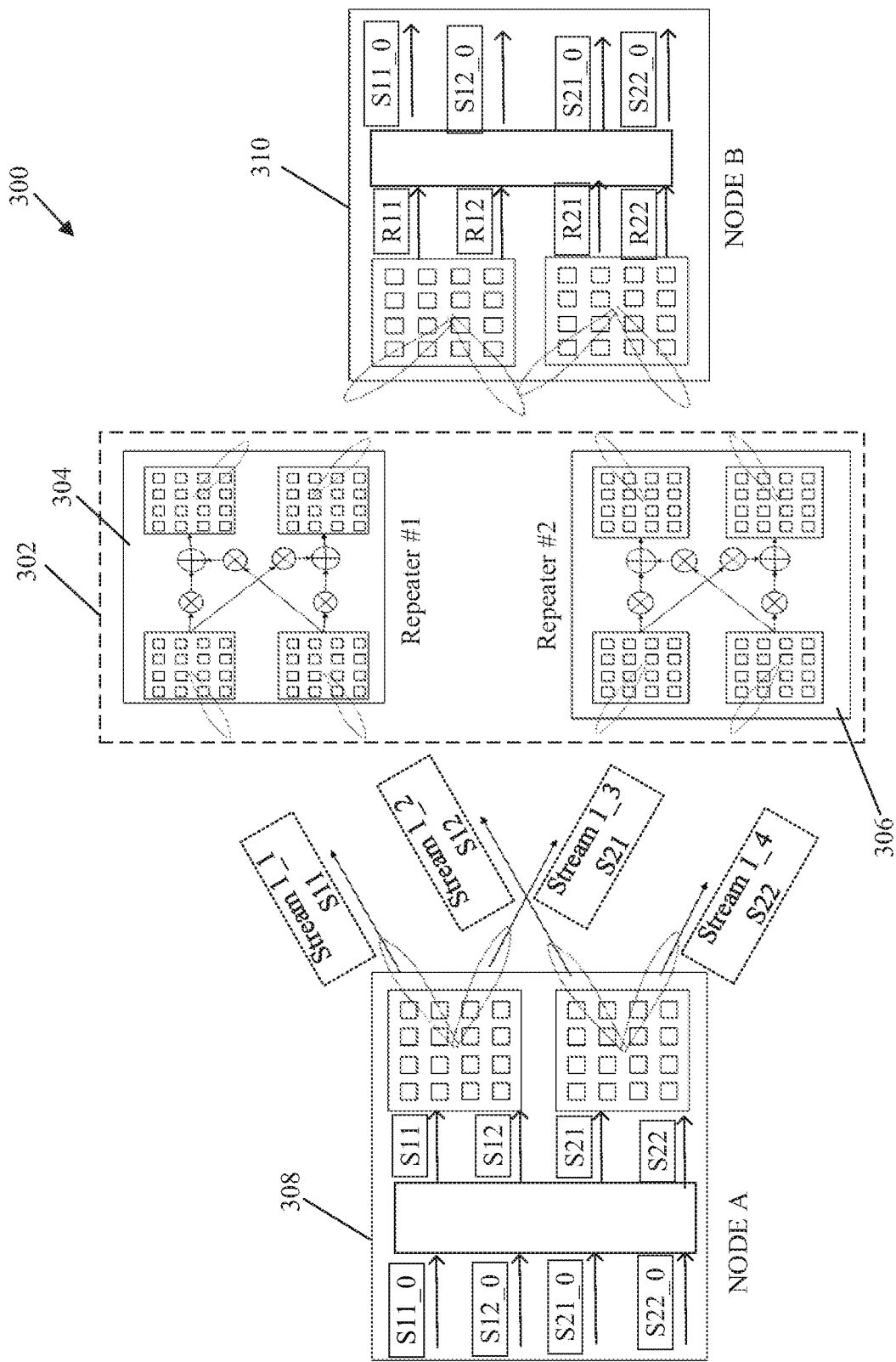
FIG. 3 is a network environment of a communication system with a repeater system, in accordance with an exemplary embodiment of the disclosure.

FIG. 3 is a network environment of a communication system with a repeater system, in accordance with an exemplary embodiment of the disclosure. FIG. 3 is explained in conjunction with elements from FIGS. 1 and 2. With reference to FIG. 3, there is shown a communication system 300 that may include a repeater system 302. In FIG. 3, the communication system 300 that includes the repeater system 302 represents a distributed multi-array MIMO over different repeater devices of the repeater system 302. There is further shown repeater devices 304 and 306 of the repeater system 302, a source network node 308, (i.e. node A), and a destination network node 310 (i.e. node B). The repeater system 302 corresponds to the repeater system 102.

In this embodiment, a plurality of nodes (e.g., the source network node 308, (i.e. node A), the destination network node 310 (i.e. node B), the repeater device 304 (i.e. repeater #1), and the repeater device 306 (i.e. repeater #2)) may deploy multiple physical antenna arrays to expand on their MIMO processing capabilities, as shown in FIG. 3. In this case, the physically separated (i.e. distinguished) antenna arrays may be deployed for transmitting multiple streams. For example, as shown in FIG. 3, each antenna array may be configured to transmit two data streams through two different beams, and a total four streams are transmitted by the source network node 308, (i.e. node A).

In accordance with an embodiment, one or more implementations may be jointly or separately supported by the communication system 300. For example, in a first implementation, all beams and data streams (e.g. streams S11, S12, S21, and S22 carried by different beams of RF signals) shown in the FIG. 3, may be transported over the same antenna radiation polarity (e.g. all transmitted over vertical polarization, or all transmitted over horizontal, or all transmitted over circular polarization). In a second implementation, a subset of beams (and streams) shown in the FIG. 3, may be transported over H polarization, while another subset may be transported over V polarization. Additionally, in some embodiments, the subset of beams in a certain polarization may differ between nodes (i.e. the source network node 308 and the destination network node 310) and the repeater devices 304 and 306. This enables additional configurability, where a stream may be transmitted on a certain polarization type, while being re-transmitted by a repeater device (e.g. the repeater devices 304 or the repeater device 306) of the repeater system 302 on a different polarization type.

In a third implementation, additional cross-coefficients (i.e. the plurality of signal parameters) may be implemented and utilized in following approaches. In a first approach (a), such plurality of signal parameters (e.g. complex value parameters of gain/phase) may use the expression: $a_{11}*\exp(j*phi_{11})$. Each repeater device (such as repeater devices 304 and 306) may include different values for these signal parameters. In some embodiments, 8 total complex coefficients (4 coefficients per repeater device in the repeater system 302, in this example), may be derived and selected to: 1) optimize MIMO capacity of the MIMO channel from [S11 S12; S21 S22] to [R11 R12; R21 R22]. In this embodiment, these complex coefficients to maximize the sum of eigenvalues of the 4×4 MIMO channel matrix. 2) Optimize effective SNR for some or all of streams S11_0, S12_0, S21_0, S22_0. In this case, the destination network node 310 (i.e. target) may maximize link robustness and SNR margin.

In a second approach (b), relative gain adjustment between streams may be achieved based on the plurality of signal parameters (i.e. additional cross-coefficients or values) selected at each repeater device (such as repeater devices 304 and 306). The plurality of signal parameters (i.e. the coefficients) may be utilized as joint gain control across the source network node 308, the destination network node 310 (node A and node B) or repeater devices 304 and 306 and across all streams in order to provide a balance between relative power levels of streams R11, R12, R21, R22 at the destination network node 310 (i.e. node B), and to ensure that no stream degrades other streams due to high power level and inherent cross-leakage.

In a third approach (c), selection and optimization of beam patterns across the network nodes (the source network node 308 and the destination network node 310) and the repeater devices 304 and 306 and the plurality of signal parameters (i.e. complex coefficients) inside each of the repeater devices 304 and 306 may be done jointly. This optimization may be performed in one of network nodes (e.g., the source network node 308 (i.e. node A) as a master node or a central node), or may be performed in a remote server that has access to the plurality of measurements from various network nodes and the repeater devices 304 and 306. Such optimization of beams and signal parameters (i.e. coefficients) may be based on, (1) optimizing sum-capacity of MIMO channel over the data streams S11, S12, S21, S22, where the aggregate capacity delivered to the destination network node 310 (i.e. node B) is maximized. Such optimization of beams and signal parameters (i.e. coefficients) may be further based on, (2) optimizing effective SNR on a subset of streams (this approach is used when link reliability (or margin) may be the primary figure (or parameter) of merit. For example, the beams and the plurality of signal parameters (i.e. the complex coefficients) may be selected to maximize SNR on the data streams S11 and S12 only.

In a fourth implementation, various beams (carrying corresponding streams) deployed at the network nodes (the source network node 308 and the destination network node 310) and the repeater devices 304 and 306, may be operating all over a single carrier frequency. In a fifth implementation, various beams (carrying corresponding streams) deployed at the network nodes (the source network node 308 and the destination network node 310) and the repeater devices 304 and 306, may be operating selectively over different carrier frequencies. This embodiment may be utilized when a plurality of streams may be transported over different channels (or carriers) in a carrier-aggregation mode of operation.

In a sixth implementation, the plurality of signal parameters (i.e. the complex coefficients or values) inside the repeater devices 304 and 306 (i.e. the repeater 1 or 2) may deploy fixed values to implement an intermediary MIMO processing on the streams passing through a repeater device (e.g. the repeater device 304 or repeater device 306). For example, these signal parameters (i.e. complex value) may form a 2×2 matrix structure of [+1 +1; +1 −1] that may effectively apply a unitary MIMO processing on the data streams. In certain scenarios, the destination repeater device 306 (node B) may be further configured to receive data streams/beams on two different polarizations, where the 2×2 unitary matrix operation may effectively distribute each received polarization onto both outgoing polarizations.

In a seventh implementation, the line-of-sight MIMO (LOS-MIMO) processing and optimization may be implemented for the links between source network node 308 (i.e. node A) and destination network node 310 (i.e. node B) through repeaters #1 and #2 (i.e. the repeater devices 304 and 306). In this mode of configuration, although all links between different nodes are line-of-sight, the phase differences between different paths and antenna arrays, provide a degree of separation that may be utilized for exploiting the channel as a MIMO channel. In this mode of operation, the plurality of signal parameters (i.e. the complex coefficients) inside repeaters #1 and #2 (i.e. the repeater devices 304 and 306) may be used for optimizing the MIMO capacity of the overall equivalent channel from source network node 308 (i.e. node A) to destination network node 310 (i.e. node B).

Figure 4:
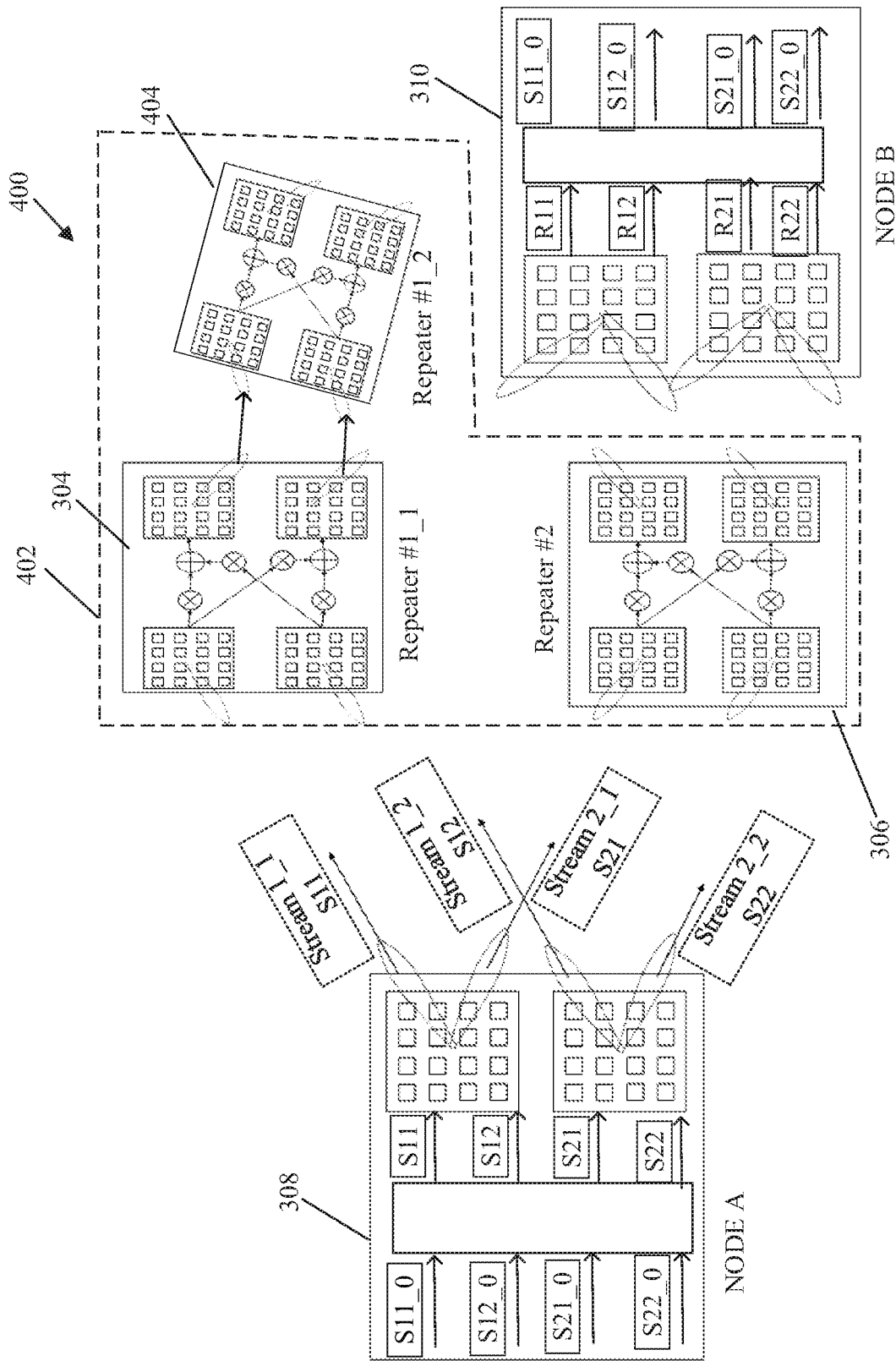
FIG. 4 is a network environment of a communication system with a repeater system, in accordance with an exemplary embodiment of the disclosure.

FIG. 4 is a network environment of a communication system with a repeater system, in accordance with another exemplary embodiment of the disclosure. FIG. 4 is explained in conjunction with elements from FIGS. 1, 2, and 3. With reference to FIG. 4, there is shown a communication system 400 that may include a repeater system 402 that includes an additional repeater device, such as a repeater device 404. In FIG. 4, the communication system 400 that includes the repeater system 402 represents a distributed multi-array MIMO over multi-hop repeater devices of the repeater system 402. There is shown the repeater devices 304, 306, and 404 of the repeater system 402, the source network node 308 (i.e. node A), and the destination network node 310 (i.e. node B) of FIG. 3.

In this embodiment, the source network node 308 (i.e. node A) and the destination network node 310 (i.e. node B) may communicate through two repeater paths, where one repeater path is a cascade of two individual repeaters (i.e. the repeater devices 304 and 404, which are also referred to as repeater #1_1 and repeater #1_2 respectively). In the multi-hop path, the links between "the source network node 308 (i.e. node A) and repeater #1_1 (i.e. the repeater device 304)" and the "repeater #1_2 (i.e. the repeater device 404) and the destination network node 310 (i.e. the node B)" may operate at access carrier frequency (e.g., 28 GHz band), whereas the link between "repeater #1_1 (i.e. the repeater device 304) and repeater #1_2 (i.e. the repeater device 404)" may operate at a different carrier frequency (e.g., 60 GHz, or, in another example, some backhaul carrier frequency or out-of-band carrier frequency).

Figure 5:
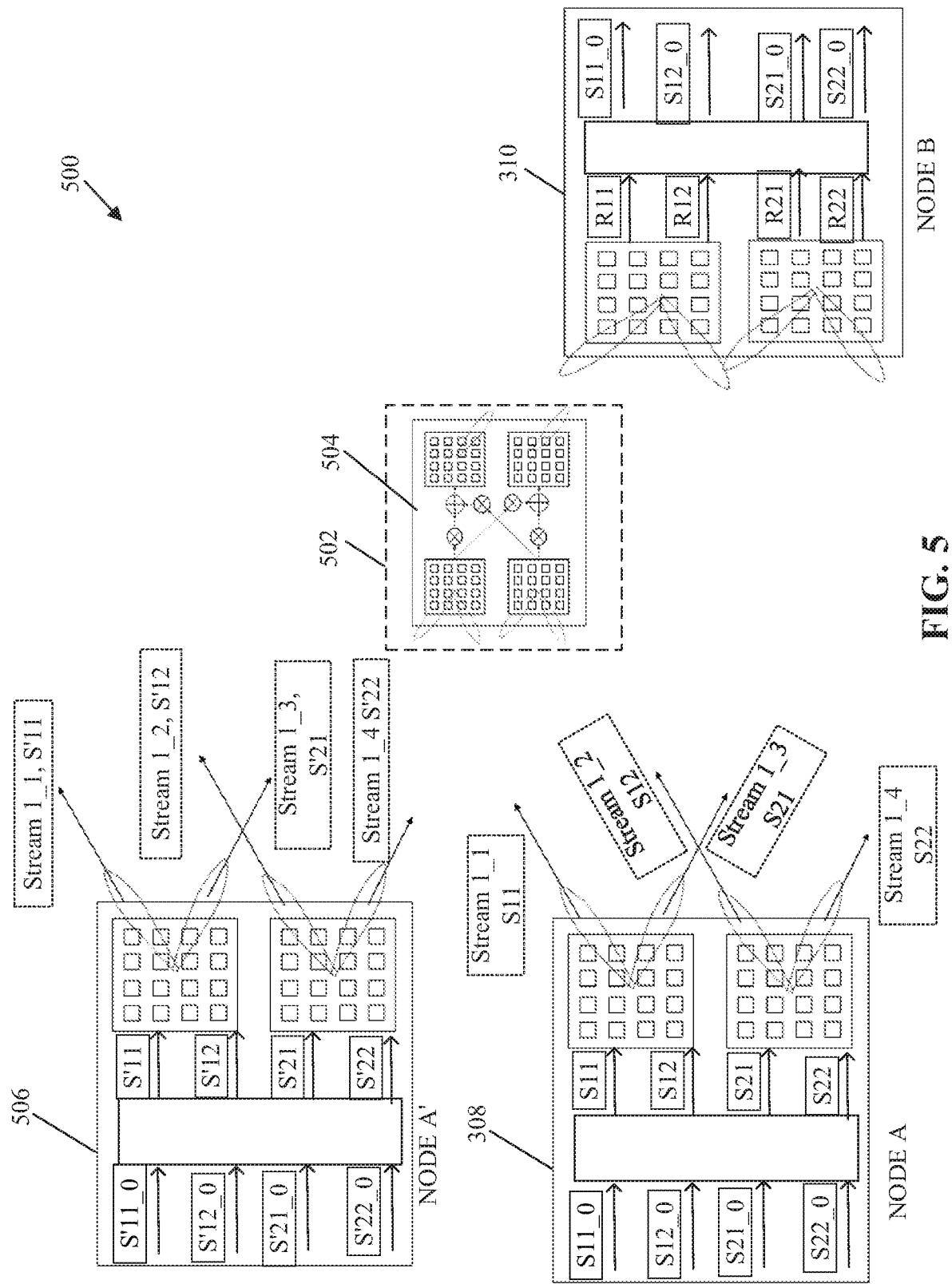
FIG. 5 is a network environment of a communication system with a repeater system, in accordance with an exemplary embodiment of the disclosure.

FIG. 5 is a network environment of a communication system with a repeater system, in accordance with an exemplary embodiment of the disclosure. FIG. 5 is explained in conjunction with elements from FIGS. 1, 2, 3, and 4. With reference to FIG. 5, there is shown a communication system 500 that may include a repeater system 502 that includes a single repeater device, such as a repeater device 504. In FIG. 5, the communication system 500 that includes the repeater system 502 represents a distributed MIMO over one or more repeater device, such as the repeater device 504, in a multi-source case. There is further shown the source network node 308 (i.e. node A), another source network node 506 (i.e. node A'), and the destination network node 310 (i.e. node B).

In this embodiment, each of the plurality of source network nodes 308 and 506 (node A and A') may be configured to concurrently communicate with the destination network node 310 (i.e. node B) through a network of repeater devices (only a single-repeater case, such as the repeater device 504, is shown here for sake of brevity). In some embodiments, the source network node 308 (i.e. node A) may be configured to communicate two data streams intended for an end-user device, such as the destination network node 310 (i.e. node B), while the source network node 308 (i.e. node A) may have data streams intended for other devices in the network (those devices not shown in the FIG. 5). For example, the data streams S11 and S12 may be intended for the destination network node 310 (i.e. node B), while data streams S21 and S22 may be intended for other network nodes in the environment. Similarly, the data streams S'21 and S'22 may be communicated by the other source network node 506 (i.e. node A') for the destination network node 310 (i.e. node B).

In accordance with an embodiment, the source network node 308 (i.e. node A) may be configured to utilize different coding methods for generating data streams S11 and S12. Such coding schemes for generating the data streams S11 and S22 may include, but is not limited to, spatial multiplexing, spatial diversity, or MIMO coding, or variations thereof (described for example, in FIG. 1). In some embodiments, the repeater device 504 (i.e. the repeater #1) may implement at least one configuration: 1) a single array, single beam, 2) single array, multi-beam, 3) multi beams over different polarizations, 4) two physically separated arrays, each array with single/multiple beams.

In accordance with an embodiment, the data streams S11 and S12 may be transported by the source network node 308 (i.e. node A) and data streams S'21 and S'22 may be transported by node A', all towards same end user, such as the destination network node 310 (i.e. node B). In such a case, these streams may be transported over different frequency channels/bands, e.g., the source network node 308 (i.e. node A) may stream over one channel and the other source network node 506 (i.e. node A') may stream over a different channel. Further, in such a case, all streams may be transported over same channel, maximizing frequency re-use. In this case, various data streams may be distinguished through spatial separation or MIMO processing. Moreover, the data streams (or original information bits) communicated by the source network nodes 308 and 506 (node A and A') may be correlated or may have dependency with each other. In this mode, the redundancy or correlation between the streams are intended or designed to provide better diversity, robustness, reliability, or capacity, by exploiting the richer and larger MIMO channel matrix between the network nodes, such as the source network nodes 308 and 506 (node A and A').

In accordance with an embodiment, the coordination between data streams communicated from the source network nodes 308 and 506 (node A and A') may be in: 1) in frequency domain, as a carrier aggregation method of operation; 2) in time domain, by the source network nodes 308 and 506 (node A and A') coordinating the time slots used by each source network node, 3) spatial domain, by relaying on spatial separation between the paths originated from the source network node 308 (i.e. node A) versus the source network node 506 (i.e. node A').

Figure 6:
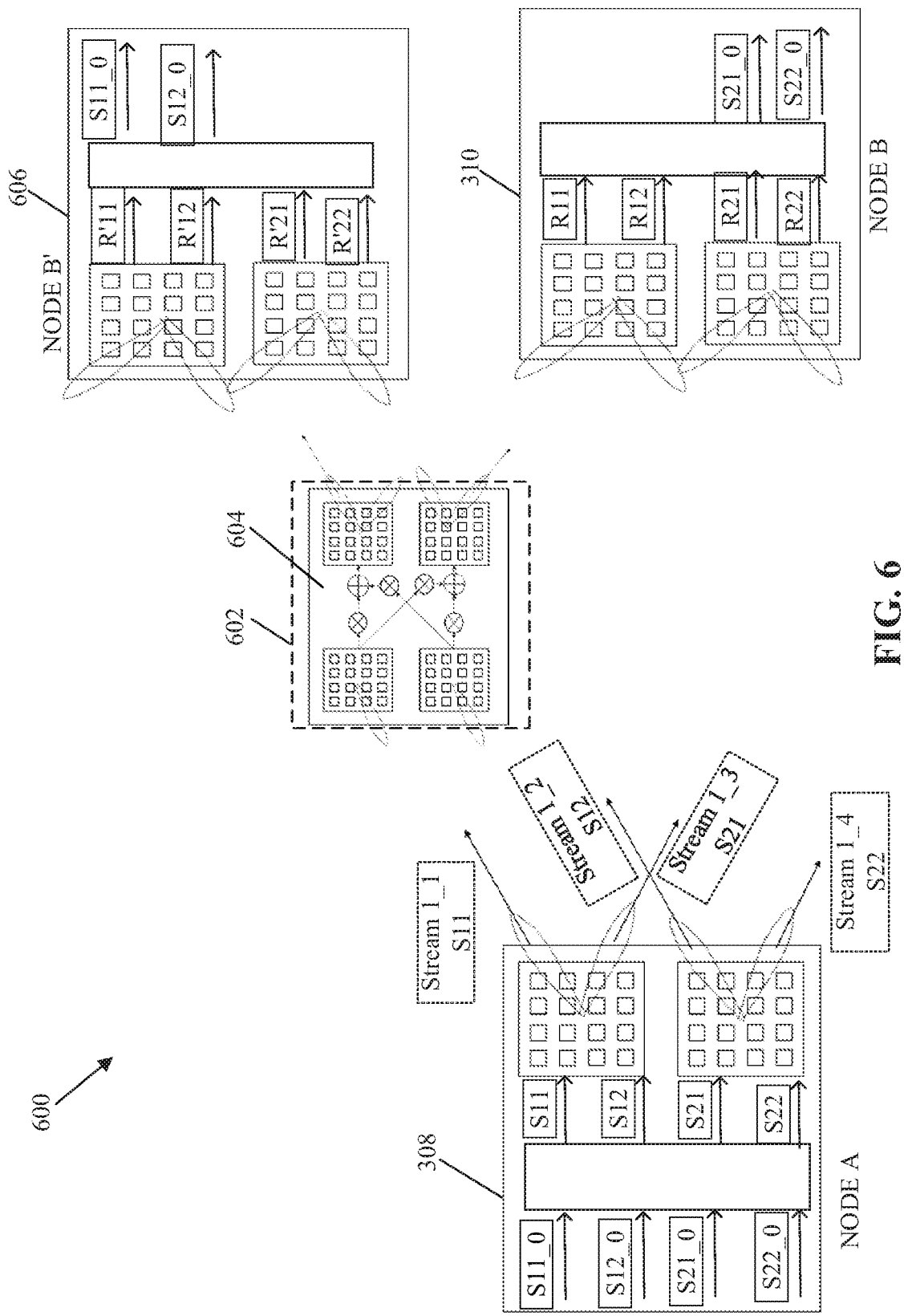
FIG. 6 is a network environment of a communication system with a repeater system, in accordance with an exemplary embodiment of the disclosure.

FIG. 6 is a network environment of a communication system with a repeater system, in accordance with another exemplary embodiment of the disclosure. FIG. 6 is explained in conjunction with elements from FIGS. 1 to 5. With reference to FIG. 6, there is shown a communication system 600 that may include a repeater system 602 with a repeater device 604. In FIG. 6, the communication system 600 that includes the repeater system 602 represents a distributed MIMO over one or more repeater devices, such as the repeater device 604, in a multi-destination case. There is further shown the source network node 308 (i.e. node A), the destination network node 310 (i.e. node B), and an additional destination, such as a destination network node 606 (i.e. node B').

In this embodiment, the source network node 308 (i.e. node A) and the repeater device 604 may be utilized and configured for transporting data to multiple destination nodes, such as the destination network nodes 310 and 606 (node B and B'). Various implementations and configurations described, for example, in FIGS. 1 to 5, may also be applied to the network topology of FIG. 6. In an implementation, data streams intended for end users, such as the destination network nodes 310 and 606 (node B and B') may be separated in frequency domain (e.g. allocation of different subcarriers to different destination network nodes 310 and 606 in an orthogonal frequency-division multiplexing (OFDM) system).

In some embodiments, the repeater device 604 (i.e. the repeater #1) may be further configured to communicate, by use of a transmitting antenna array, wide beams to transmit signals towards the destination network nodes 310 and 606 (nodes B and B'). In this case, the wide beam radiation pattern at output of the repeater device 604 may concurrently provide signal coverage at both the destination network nodes 310 and 606. In this case, a single radiation beam may be sufficient to cover multiple destination nodes (nodes B and B'). In accordance with an embodiment, the plurality of signal parameters (i.e. the complex coefficients) may be selected in the repeater device 604 to adjust a relative power of signals being transported towards the destination network nodes 310 and 606 (nodes B and B'). For example, if the two nodes B and B' (i.e. the destination network nodes 310 and 606) are assigned different polarizations by the source network node 308 (node A), the relative powers of corresponding signals at output of the repeater device 604 may be adjusted (e.g., equalized) to minimize or at least reduce, for example, a worst case cross leakage between the signals intended for different destination nodes (e.g. the destination network nodes 310 and 606).

Figure 7:
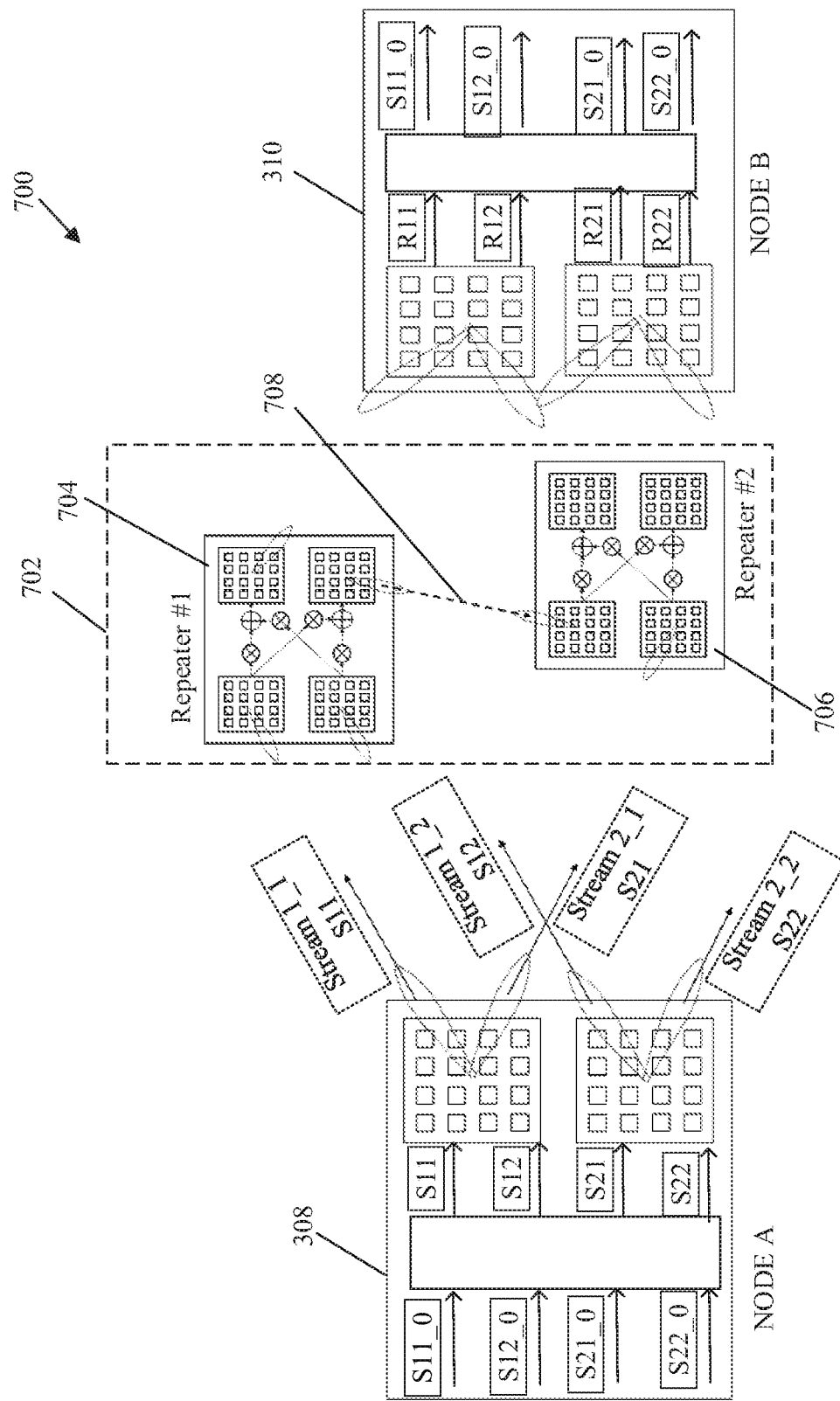
FIG. 7 is a network environment of a communication system with a repeater system, in accordance with an exemplary embodiment of the disclosure.

FIG. 7 is a network environment of a communication system with a repeater system, in accordance with an exemplary embodiment of the disclosure. FIG. 7 is explained in conjunction with elements from FIGS. 1 to 6. With reference to FIG. 7, there is shown a communication system 700 that may include a repeater system 702 that include repeater devices 704 and 706. There is further shown the source network node 308 (i.e. node A) and the destination network node 310 (i.e. node B). In FIG. 7, the communication system 700 represents a distributed MIMO with multi-repeater deployment with inter-repeater routing.

In this embodiment, the repeater devices 704 and 706 (i.e. the two repeaters #1 and #2) may be deployed to facilitate the communication between the source network node 308 (i.e. node A) and the destination network node 310 (i.e. node B). A subset of following links may be established and utilized, in accordance with previous embodiments and implementations, described, for example, in FIGS. 1 to 6: 1) the source network node 308 (i.e. node A) to the repeater device 704 (Repeater #1); 2) the repeater device 704 (Repeater #1) to the destination network node 310 (i.e. node B); 3) the source network node 308 (i.e. node A) to the repeater device 706 (repeater #2); and 4) the repeater device 706 (repeater #2) to the destination network node 310 (i.e. node B). In some embodiments, an additional link 708 may be established between the repeater devices 704 and 706 (i.e. the two repeaters #1 and #2), as shown. For example, the repeater device 704 (Repeater #1) may use one of its receiving antenna arrays to receive beam of RF signal carrying a stream from the source network node 308 (i.e. node A), and use one of its transmitting antenna arrays (and beam) to transport that signal (concurrently) towards a receiving antenna array/beam at the repeater device 706 (Repeater #2). Consequently, the repeater device 706 (Repeater #2) is configured to direct (i.e. re-transmit) the received signal to end user, such as the destination network node 310 (i.e. node B). The additional link 708 between the repeater devices 704 and 706 may create an additional dimension in the MIMO channel between the source network node 308 (i.e. node A) and the destination network node 310 (i.e. node B). The additional link 708 (with configurable gain/phase multipliers, such as plurality of signal parameters) may be used to execute gain and phase control operation 202 to enhance the MIMO channel's degrees of freedom, eigenvalue rank, MIMO capacity, effective SNR, and diversity rank, among other parameters.

Figure 8:
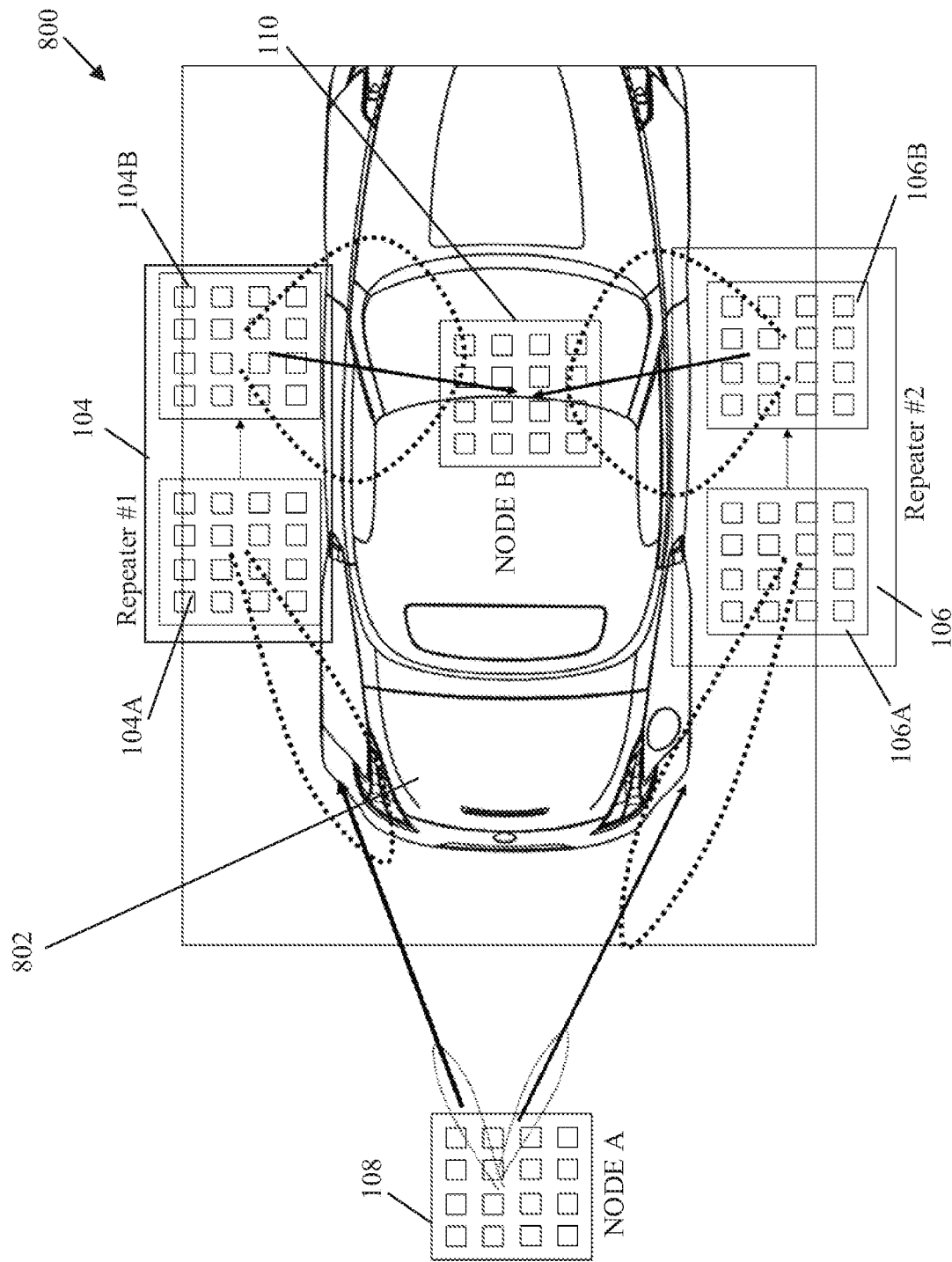
FIG. 8 is an illustration of an exemplary scenario of implementation of a repeater system, in accordance with an exemplary embodiment of the disclosure.

FIG. 8 is an illustration of an exemplary scenario of implementation of a repeater system, in accordance with an exemplary embodiment of the disclosure. FIG. 8 is explained in conjunction with elements from FIGS. 1 to 7. With reference to FIG. 8, there is shown an exemplary scenario 800 that includes a vehicle 802, the first repeater device 104, the second repeater device 106, the first network node 108 (node A), and the second network node 110 (node B) (of FIGS. 1 and 2). In FIG. 8, various selection operations for a network of repeater devices is described, for example, by use of the exemplary scenario 800.

In some deployment scenarios, a plurality of antenna arrays within a network of repeaters may be utilized for providing coverage over a same area. In the exemplary scenario 800, the first repeater device 104 and the second repeater device 106 may be mounted on the vehicle 802. The first repeater device 104 in synchronization to the second repeater device 106 may be configured to select one or more beamforming schemes to illuminate space inside the vehicle 802 such that both an uplink and a downlink communication is established between the first network node 108 and a user device corresponding to the second network node 110 (node B) present within the vehicle 802. In other words, multiple repeater devices may be installed on the vehicle 802, with the goal of providing coverage inside the vehicle 802 and to the passengers' devices. In this case, multiple repeater devices may be designed to have antenna arrays and beam patterns that can illuminate space inside the vehicle 802. However, given the mobility of the vehicle 802, not all these repeater devices installed on the vehicle 802 may consistently have visibility to the first network node 108 (node A, such as a base station), where a repeater device with a best visibility status may dynamically change. This improves the coverage, reliability, and network capacity. Thus, at least one of the first repeater device 104 and the second repeater device 106 may be further configured to be activated or deactivated based on the visibility status to the first network node 108 when the vehicle 802 in in motion. In this example, the first network node 108 (node A) may be a cellular base station and the second network node (Node B) may be an end user equipment or the user device on a cellular network (e.g., a smartphone, a tablet, an in-vehicle entertainment system, an augmented reality (AR)/virtual reality (VR) device, or headset, etc.).

In accordance with an embodiment, the first repeater device 104 and the second repeater device 106 (Repeaters #1 and #2) may be installed on the vehicle 802 to enhance passengers' connectivity and access to the cellular network. The first repeater device 104 and the second repeater device 106 may utilize a configuration in which a wide beam is used on an antenna array facing inside the vehicle 802 (to/from passengers' equipment, such as the second network node 110). This wide beam illumination towards the interior of the vehicle 802 enables 1) providing robust and reliable coverage for the second network node 110 (node B) by reducing sensitivity to beam tracking on the link between the second network node 110 (node B) and the first repeater device 104 and the second repeater device 106 (Repeaters #1 and #2); and 2) requiring less power consumption and reduces dissipation by the second network node 110 (node B), as the uplink distance to be supported by the second network node 110 (node B) towards next immediate node (i.e., the first repeater device 104 and the second repeater device 106) would be in the range of less than a few meters.

In some embodiments, the implementation of the first repeater device 104 and the second repeater device 106 (Repeaters #1 and #2), may be such that the antenna arrays provided in each of the first repeater device 104 and the second repeater device 106 may be installed (i.e. placed) at different locations, orientations, while connected to each other through some wired means (e.g. cables). In such cases, one antenna array connecting to the first network node 108 (node A) may be installed on the vehicle 802 in a manner facing towards outside, whereas one antenna array facing the second network node 110 (node B) may be installed such that its facing towards inside the vehicle 802.

In accordance with an embodiment, each of the first repeater device 104 and the second repeater device 106 may be further configured to determine a plurality of criteria when the vehicle 802 in in motion. At least one of the first repeater device 104 or the second repeater device 106 may be activated or deactivated based on the determined plurality of criteria when the vehicle 802 in in motion. In some embodiments, a repeater device selection method may be implemented in order to select a subset of the repeater devices on the vehicle 802 that are activated/ON, and to select another subset of repeater devices on the vehicle 802 that are prevented from creating links to the second network node 110 (node B). Such selection method (or operation) may be implemented and operational on one of repeater devices (e.g. the first repeater device 104 or the second repeater device 106) or one of the repeater devices designated as a master repeater device), or even on the first network node 108 (node A), or the second network node 110 (node B), or a remote server. In some embodiments, the selection method (or operation) is implemented on an electronic control unit (ECU) (e.g. a processor system) that is provided in the vehicle 802.

In some embodiments, the selection of an active repeater device from a plurality of repeater devices (such as the first repeater device 104 and the second repeater device 106) installed on the vehicle 802 may be done in a dynamic manner. For example, as the vehicle's position or orientation with respect to the first network node 108 (node A) changes, the subset of repeater devices (e.g. the first repeater device 104) with comparatively better signal reception from the first network node 108 (node A) may be selected. As a result, an optimal subset of repeater devices with best link quality between the selected repeater device and the first network node (node A) may be updated. The disclosed selection method (i.e. selection operations) may be configured for dynamic selection of active repeaters as the vehicle 802 moves or as the environment changes. For example, if the link between the first network node 108 (node A) and the first repeater device 104 (repeater #1) is blocked by another object, the selection method would then switch the active repeater that is illuminating inside the vehicle 802 from the first repeater device 104 to the second repeater device 106. Various measurement metrics and mechanism (i.e. the plurality of criteria) may be utilized for identifying and/or deciding which subset of repeaters to keep active/ON and which subset to keep inactive/OFF. In some embodiments, the circuitry and digital logic within a repeater device (e.g. the first repeater device 104) may measure and quantify the links quality between corresponding repeater device and the first network node 108 (node A). Examples of the plurality of criteria (e.g. the metrics) may include, but are not limited to, received signal strength indicator (RSSI), signal to noise ratio (SNR) of the link between the first network node 108 (node A) and the corresponding repeater device. These criteria (measurements) from all repeater devices installed on the vehicle 802 may be then processed and analyzed jointly, to identify the optimal subset of repeater devices to be activated/ON. In some embodiments, such measurements may be sent to the ECU (i.e. the processor system) hosted on the vehicle 802 to perform the selection of a suitable repeater device. In some other embodiments, such selection process may be performed on one the first repeater device 104 or the second repeater device 106 (designated as master repeater device), or at the second network node 110 (node B), or at a remote server on the network (e.g. a cloud server). In some embodiments, the selection operation may keep only one repeater active at a time (i.e., select the best repeater with best link quality to the node B). In some embodiments more than one repeater device may be activated concurrently. For example, in case of multi-stream and/or multi-beam configuration, multiple repeater devices may be activated concurrently, where each active repeater device may be optimized and configured for one or subset of intended beams/streams to end user (i.e. node B). In some other embodiments, a plurality of repeater devices (such as the first repeater device 104 and the second repeater device 106) may be active concurrently, to provide signals to the end user, such as the second network node 110 (Node B) concurrently even for the same data stream. This embodiment may be utilized for cases that provide additional diversity on the same stream and when the end user such as the second network node 110 (Node B) is capable of processing/re-solving the signals coming from different repeaters (e.g., different non-overlapping beams, equalization, etc.), so the self-interference between data paths provided through multiple active repeaters may be mitigated.

It is to be understood that various embodiments and implementations described, for example, in FIGS. 1 to 7, including multi-beam, multi-stream, spatial multiplexing, dual-polarization, spatial diversity, multi-hop repeaters, multi-arrays nodes, may be applied to the embodiment described in FIG. 8. It is to be understood by a person of ordinary skill in the art that although a car is shown as the vehicle 802, the vehicle 802 use case may be extended to other use cases 1) mobile vehicles (train, bus, airplane, etc.), or 2) stationary network nodes and repeater devices, where there is mobility/change in the surrounding environment.

Figure 9:
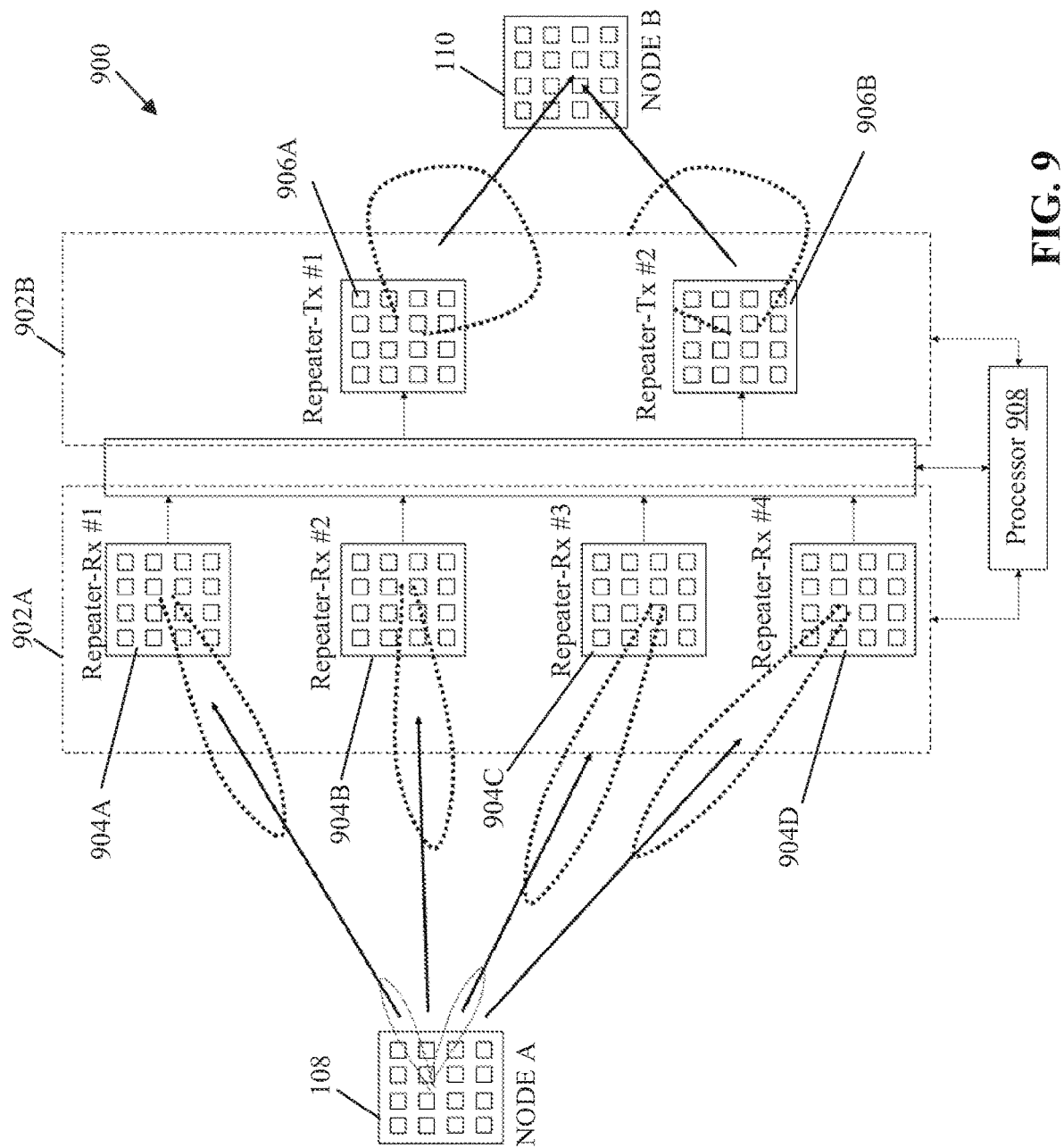
FIG. 9 is a network environment of a communication system with a repeater system, in accordance with an exemplary embodiment of the disclosure.

FIG. 9 is a network environment of a communication system with a repeater system, in accordance with an exemplary embodiment of the disclosure. FIG. 9 is explained in conjunction with elements from FIGS. 1 to 8. With reference to FIG. 9, there is shown a communication system 900 that may include a repeater system that includes a receiver (Rx) sub-system 902A and a transmitter (Tx) sub-system 902B. There is further shown the first network node 108 (i.e. node A) and the second network node 110 (i.e. node B). In FIG. 9, a multi-array repeater partitioning is described, for example, in the communication system 900.

In this embodiment, there is described how several antenna arrays within a plurality of repeater devices within a network may be partitioned. As shown, the repeater system (logical view of repeater components) may include receiving antenna arrays 904A to 904D (e.g., Repeater-RX #1, #2, #3, #4) in the Rx sub-system 902A and transmitting antenna arrays 906A and 906B (e.g., Repeater-TX #1, #2) in the Tx sub-system 902B. In general, the number of receiving antenna arrays may be larger than the number of transmitting arrays.

In accordance with an embodiment, one or more implementations may be jointly or separately supported by the communication system 900. For example, in a first implementation, each receiving antenna arrays 904A to 904D in the Rx sub-system 902A may reside inside a separate enclosure, computer board, and/or maybe physically separated from other components and modules. Similarly, each transmitting antenna arrays 906A and 906B (e.g., Repeater-Tx #1, #2) in the Tx sub-system 902B may reside inside a separate enclosure, computer board, and/or may be physically separated from other components and modules. Alternatively, pairs of repeaters Rx and Tx (e.g., Repeater-Rx #1 and Repeater-Tx #1) may be residing inside same enclosure, computer board. In some other embodiments, the Tx and Rx portions of a repeater device may be residing in separate enclosure to better address deployment requirements and constraints. In some embodiments, although the receiving antenna arrays 904A to 904D (i.e. repeaters-Rx #1-4) may be residing in different enclosures/boards, they may be coordinated/operated jointly by a central processor, as referred to as a processor 908. In such embodiments, the receiving antenna arrays 904A to 904D (repeaters-RX #1-4) may be physically separated and deployed, but may be in the same control logic domain, controlled by the processor 908.

In some embodiments related to exemplary scenario 800 described in FIG. 8, the Rx sub-system 902A may include several antenna array modules mounted on the vehicle's exterior, facing outwards for improved connectivity towards base stations. The Tx sub-system 902B may include several antenna array modules mounted on the vehicle's interior, facing inwards for best connectivity towards a user equipment (e.g., the second network node 110, i.e., Node B) inside the vehicle 802. In such embodiments, the processor 908 may be configured to monitor the measurements (i.e. determine plurality of criteria) conducted by each receiving antenna arrays 904A to 904D (i.e. repeaters-Rx #1-4), and select which of those receiving antenna arrays 904A to 904D have comparatively best signal quality from the first network node 108 (node A). The processor 908 may be further configured to activate a subset of the receiving antenna arrays 904A to 904D, and route their signals through the cross-connectivity fabric to transmitting antenna arrays, such as one of the transmitting antenna arrays 906A and 906B (e.g., Repeater-Tx #1, #2).

In some embodiments, each "repeater RX #N" (i.e. each of the receiving antenna arrays 904A to 904D) may be operated independent of other repeater sub-systems and antenna arrays. In some other embodiments, the receiving antenna arrays 904A to 904D may be operated and coordinated jointly as a bigger network of collaborative repeater sub-systems. Similar embodiments apply to the transmitting arrays, such as the transmitting antenna arrays 906A and 906B depicted in the FIG. 9.

In some embodiments, the receiving antenna arrays 904A to 904D ("repeater RX #N", N=1, 2, 3, 4) may each have configurable beam patterns, and each may be capable of receiving multiple beams or streams or polarizations, concurrently. Such configurable beam patterns may be implemented through different implementation methods, such as classic RF phase shifters or through other means of phase shifting to pass the signal through individual radiating elements.

In some embodiments, the two sub-systems, such as the Rx sub-system 902A and the Tx sub-system 902B may reside inside same enclosure, while facing different directions/orientations so some antenna arrays may face the first network node 108 (node A), while other antenna arrays may face the second network node 110 (node B). In some embodiments, the receiving antenna arrays 904A to 904D and the transmitting antenna arrays 906A and 906B (i.e. Tx and Rx arrays) may reside on the same printed computer board (PCB), to create low-cost compact solution. In some other embodiments, the corresponding TX and RX arrays may reside inside different enclosures (to facilitate certain deployment conditions and requirements). In this case, the two enclosures may be coupled together through some wired connection, wireless connection, or short-range coupling (e.g., magnetic coupling). One such example, with no loss of generality, may be where the Rx sub-system 902A may be placed outside a building/window, whereas a corresponding Tx sub-system 902B may be placed inside the building/window, where two sub-systems 902A and 902B may be then connected to each other, over copper cable, coaxial cable, an optic fiber, and the like.

In some embodiments, the "configurable cross-connectivity" fabric (CCF) may be configurable to connect any of "repeater RX #N" (for N=1, 2, 3, 4) (i.e. any of receiving antenna arrays 904A to 904D) to any of "repeater TX #N" {N=1, 2,) (i.e. any of the transmitting antenna arrays 906A and 906B). In some embodiments, this fabric may route multiple streams/beams from a subset of receiving arrays to a subset of transmitting arrays. In some embodiments, the signals being routed from a receiving array to a transmitting array may be multiplied by an equivalent complex value, so both amplitude and/or phase of the signal passing through is adjusted. In some other embodiments, the cross-connectivity may effectively implement a matrix operation of size $[A_{ij}]_{M \times N}$ where the set of streams received by plurality of array (N streams) are processed by an M×N matrix (M, being number of streams transmitting through the M arrays). This matrix operation may be implemented in digital domain, RF domain, or some intermediate frequency (IF). In some embodiments, some elements in the matrix may be zero, whereas in some other embodiments the elements may be full complex values (adjusting both gain and phase).

In some embodiments, the cross-connectivity fabric may be carrying signals in digital baseband I/O data, or analog baseband I/O data, or signal at some intermediate frequency (IF), or same original carrier frequency (no frequency shift). In Examples of the physical connectivity medium may include coaxial cables, thin coaxial cable, tracks on PCB or package, or very long coax cables placed/routed between rooms or buildings.

Figure 10:
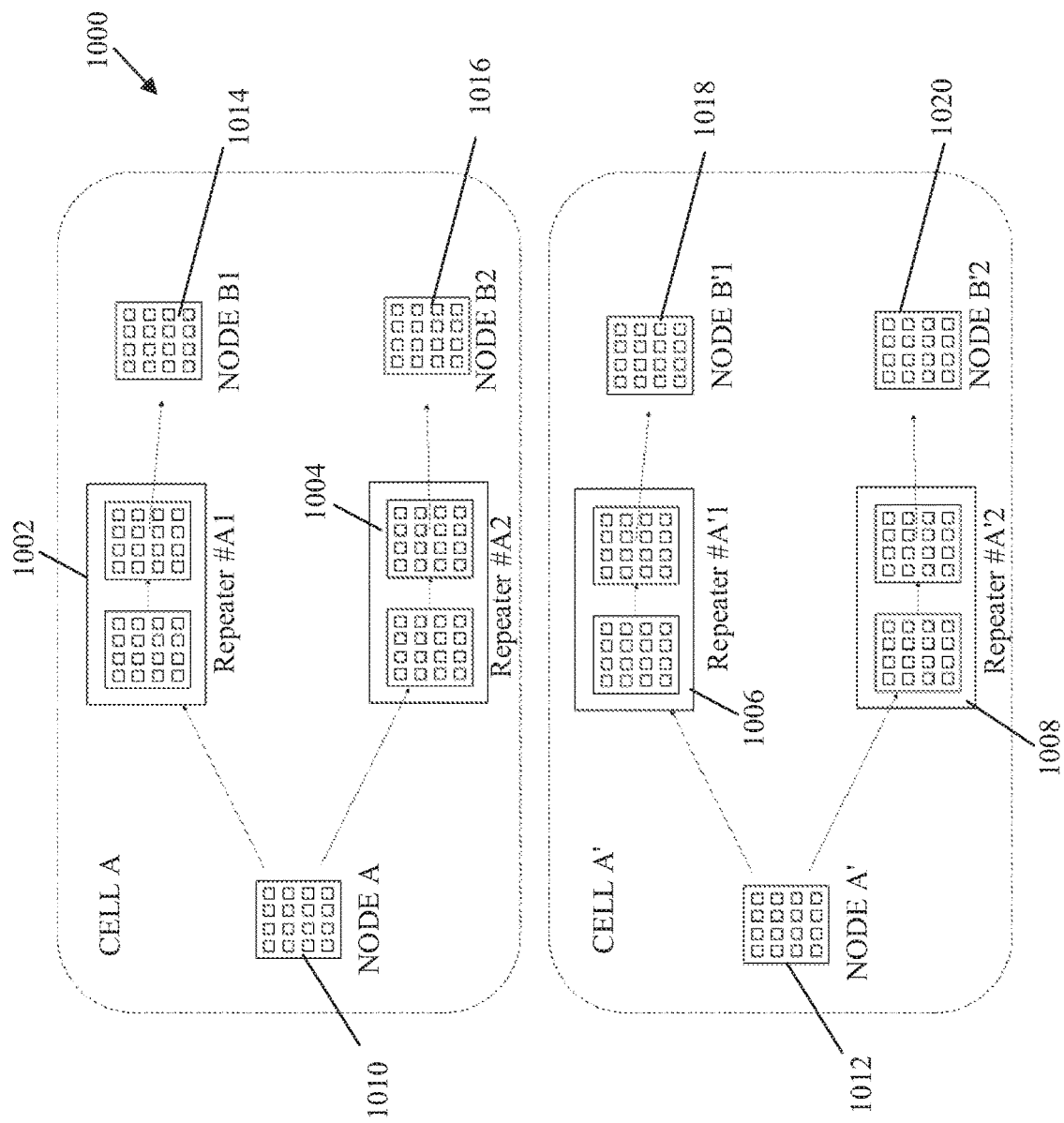
FIG. 10, FIG. 11, and FIG. 12 are illustrations that depict dynamic allocation of repeater devices of a repeater system in a network, in accordance with an exemplary embodiment of the disclosure.
Figure 11:
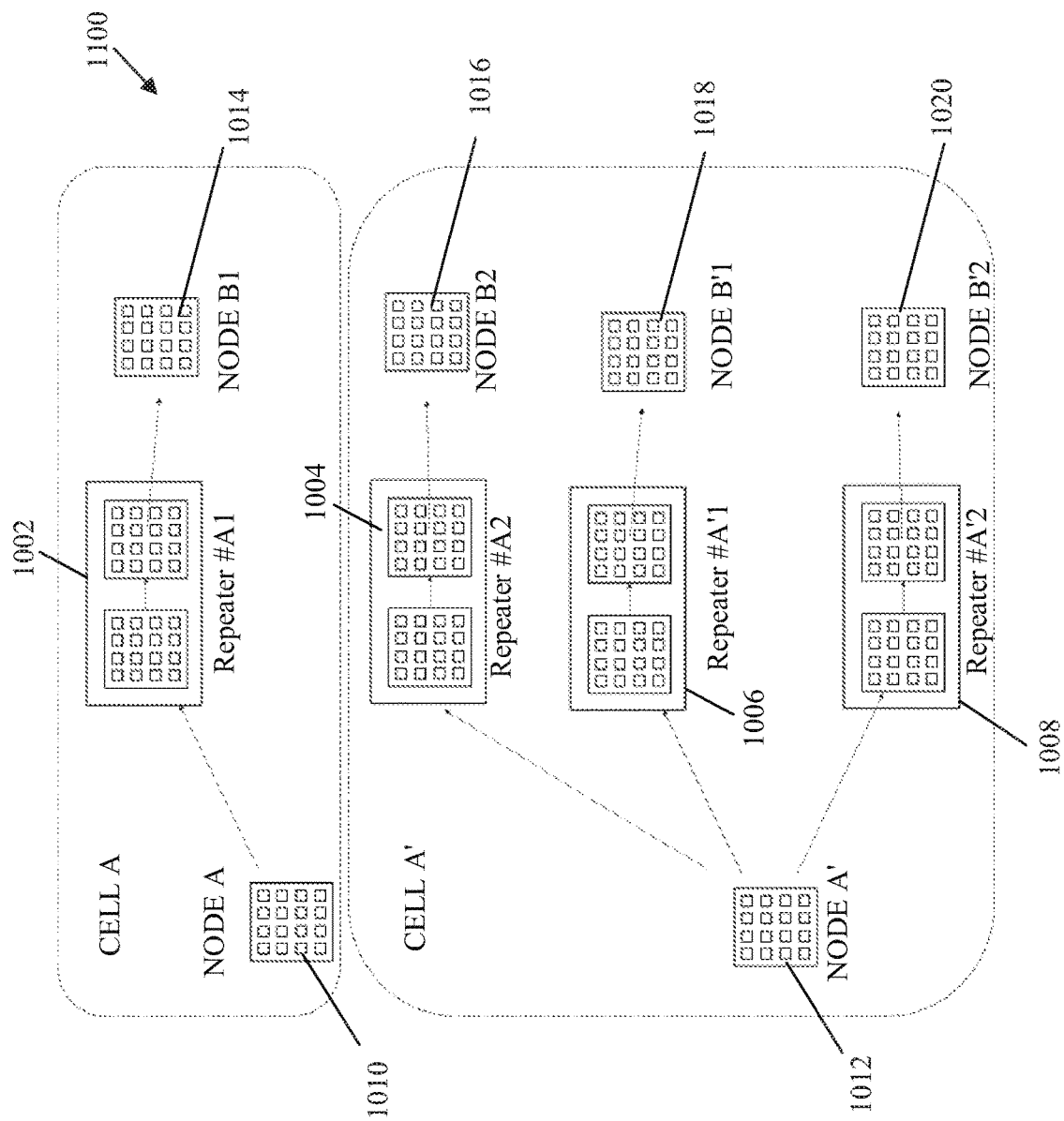
Figure 12:
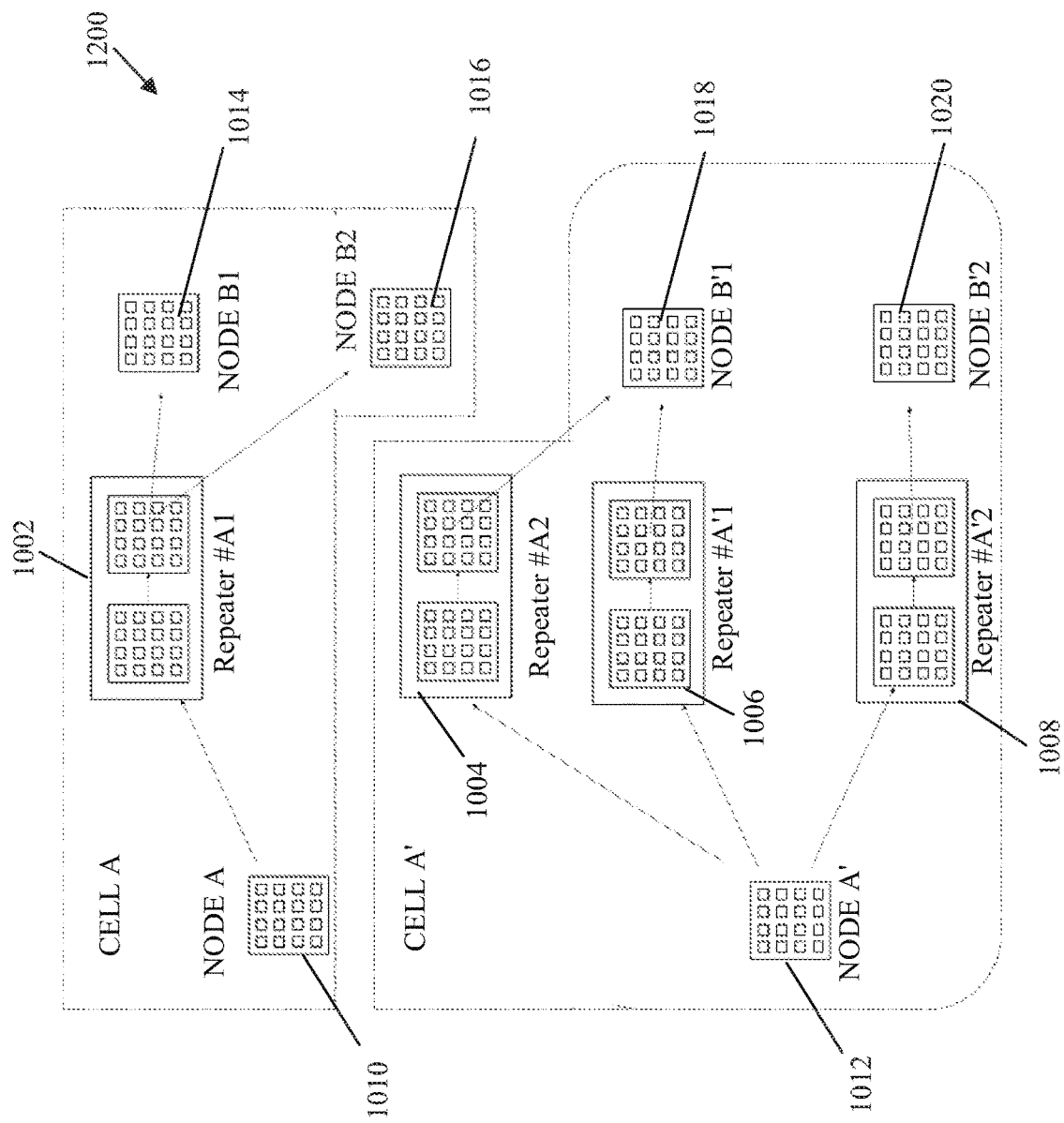

FIGS. 10, 11, and 12 are illustrations that depict dynamic allocation of repeater devices of a repeater system in a network, in accordance with an exemplary embodiment of the disclosure. FIGS. 10, 11, and 12 are explained in conjunction with elements from FIGS. 1 to 9.

With reference to FIG. 10, there is shown a network environment 1000 in which repeater devices 1002, 1004, 1006, and 1008, may be utilized in a network (licensed or unlicensed bands) for expanding coverage and throughput to end user devices. This network may be a commercial cellular network operated by a service provider, or may be a network of Wi-Fi access points operated locally as a private network. In an example, the source network nodes 1010 and 1012 (nodes A and A') may be two cellular base stations, each servicing many end users within their cell coverage (e.g. cell A and cell A'). Each cell has deployed two repeater devices as shown, for example, to improve their coverage and/or capacity. It is to be understood by a person of ordinary skill in the art that although only two end users, such as destination network nodes 1014 and 1016 (Node B1 and Node B2) are shown within cell A, the embodiment may also extend to cell A having many user equipment, where some are connected through some repeater devices, whereas some other are connected to the source network node 1010

(Node A) directly. There are also shown destination network nodes 1018 and 1020 (node B'1 and B'2) in the cell A'.

In some embodiments, an assignment of one or more repeater devices to the network nodes, may be dynamic and change dynamically over time, depending on changes in the environment (i.e. signal propagation changes) and/or changes in network traffic demands (or network traffic profile or network traffic distribution). By reallocating (or re-assignment) of one or more repeater devices between the source network nodes 1010 and 1012 (nodes A and A'), effectively the cell boundaries (propagation reach) of the source network nodes 1010 and 1012 (nodes A and A') change dynamically by re-assignment of already installed repeater devices (such as the repeater devices 1002, 1004, 1006, and 1008). In accordance with an embodiment, each of the repeater devices 1002, 1004, 1006, and 1008, may be further configured to detect a change in the surrounding environment and/or a network traffic demand within a corresponding cell (such as cell A and A'). Thereafter, one master repeater device, or any one of the repeater devices 1002, 1004, 1006, and 1008 may initiate assignment or re-assignment. For example, the repeater device 1002 may be further configured to update an assignment or a re-assignment of a plurality of other repeater devices, such as the repeater device 1004, to the source network node 1010 (node A) or the source network node 1012 (node A') based on the detected change in the surrounding environment and/or the network traffic demand. Alternatively, the assignment or re-assignment may be controlled by the network nodes, such as the source network nodes 1010 and 1012, the destination network nodes 1014, 1016, 1018, 1020, or remote server in cloud.

In some embodiments, the reallocation (or the re-assignment) of the repeater devices 1002, 1004, 1006, and 1008 between the source network node 1010 (node A) or the source network node 1012 (node A'), may be executed based on one or a plurality of metrics, given as follows:
1) a change in propagation properties between the source network node 1010 (node A) and the repeater device 1004 (i.e. repeater #A2),
2) a change in propagation properties between the source network node 1012 (node A') and the repeater device 1006 (i.e. repeater #A'1),
3) a change in propagation properties between the repeater device 1004 (repeater #A2 and the destination network node 1016 (Node B2),
4) a change in propagation properties between the repeater device 1006 (i.e. repeater #A'1) and the destination network node 1018 (Node B'1),
5) an overall traffic loading on cell A,
6) an overall traffic loading on cell A',
7) an allocation of spectral frequency channels between the cells, such as the cells A and A',
8) an availability of cell capacity, and/or
9) a change in traffic demands of end-user devices (such as the destination network node 1016 (Node B2), and/or the destination network node 1018 (Node B'1), or other network nodes close to the boundaries of two cells A and A').

FIG. 11 is explained in conjunction with elements from FIG. 10 and in continuation to the FIG. 10. With reference to FIG. 11, there is shown a network environment 1100 in which the both the repeater device 1004 and corresponding end-user device(s), such as the destination network node 1016 (Node B2) located at the boundary of the cell A (in FIG. 10) are dynamically assigned (i.e. re-allocated) to adjacent cell, cell A' in the FIG. 11.

FIG. 12 is explained in conjunction with elements from FIG. 10 and in continuation to the FIG. 10. With reference to FIG. 12, there is shown a network environment 1200 in which only the repeater device 1004 located at the boundary of the cell A (in FIG. 10) is dynamically assigned (i.e. re-allocated) to adjacent cell, cell A' in the FIG. 12 (from previously assigned cell A in FIG. 10).

Figure 13:
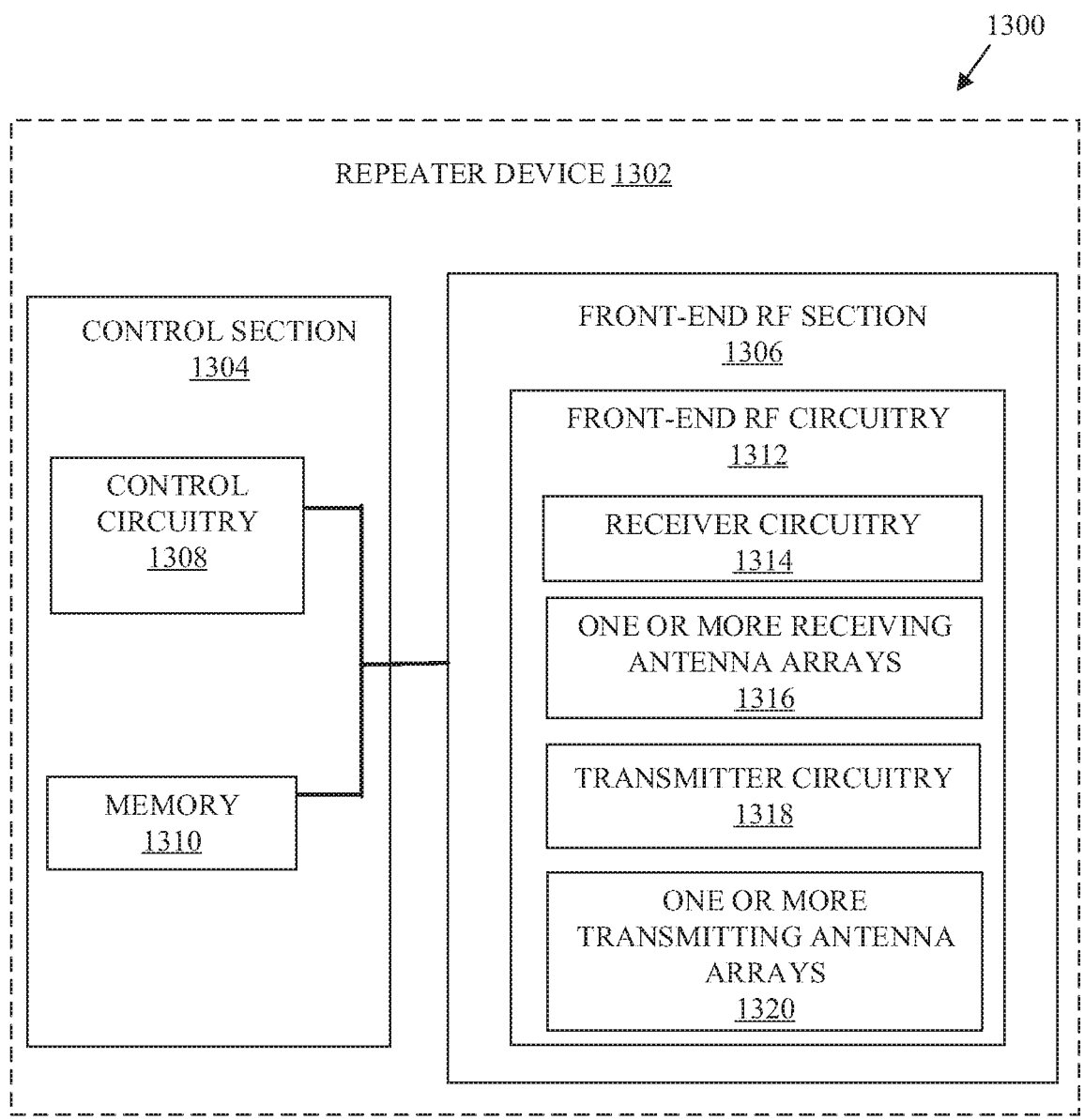
FIG. 13 is a block diagram illustrating various components of an exemplary repeater device of a repeater system, in accordance with an exemplary embodiment of the disclosure.

FIG. 13 is a block diagram illustrating various components of an exemplary repeater device of a repeater system, in accordance with an exemplary embodiment of the disclosure. FIG. 13 is explained in conjunction with elements from FIGS. 1 to 12. With reference to FIG. 13, there is shown a block diagram 1300 of a repeater device 1302. The repeater device 1302 may be an example of a repeater device used in the repeater system 102, 302, 402, 502, 602, 702 in FIGS. 1 to 12. For example, the repeater device 1302 may correspond to the first repeater device 104 or the second repeater device 106. The repeater device 1302 may include a control section 1304 and a front-end RF section 1306. The control section 1304 may include control circuitry 1308 and a memory 1310. The control section 1304 may be communicatively coupled to the front-end RF section 1306. The front-end RF section 1306 may include front-end RF circuitry 1312. The front-end RF circuitry 1312 may further include a receiver circuitry 1314, one or more receiving antenna arrays 1316, a transmitter circuitry 1318, and one or more transmitting antenna arrays 1320.

The control circuitry 1308 may be configured to execute various operations of the repeater device 1302. The control circuitry 1308 include suitable logic, circuitry, and/or interfaces configured to control various components of the front-end RF circuitry 1312. The repeater device 1302 may be a programmable device, where the control circuitry 1308 may execute instructions stored in the memory 1310. Example of the implementation of the control circuitry 1308 may include, but are not limited to an embedded processor, a microcontroller, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or state machines.

The memory 1310 may be configured store values, such as the plurality of measurements associated with each of the first network node 108, the second network node 110, and various repeater devices of the repeater system 102, 302, 402, 502, 602, or 702. The memory 1310 may be further configured store the plurality of signal parameters (e.g. the complex coefficients). Examples of the implementation of the memory 1310 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 1304 may further include one or more other components, such as an analog to digital converter (ADC), a digital to analog (DAC) converter, a cellular modem, and the like, known in the art, which are omitted for brevity.

The front-end RF circuitry 1312 includes the receiver circuitry 1314 and the transmitter circuitry 1318. The receiver circuitry 1314 is coupled to the one or more receiving antenna arrays 1316, or may be a part of the receiver chain. The transmitter circuitry 1318 may be coupled to the one or more transmitting antenna arrays 1320.

The front-end RF circuitry 1312 supports multiple-input multiple-output (MIMO) operations, and may be configured to execute MIMO communication with a plurality of end-user devices. The MIMO communication may be executed at a sub 6 gigahertz (GHz) frequency or even mmWave frequency.

The receiver circuitry 1314 may be configured to control the one or more receiving antenna arrays 1316 which are configured to receive one or more beams of RF signals carrying one or more data streams from a source network node (e.g. the first network node 108 or node A) via a first communication path. In an example, the receiver circuitry 1314 may include a cascading receiver chain comprising various components for baseband signal processing or digital signal processing. For example, the receiver circuitry 1314 may include a cascading receiver chain comprising various components (e.g., the one or more receiving antenna arrays 1316, a set of low noise amplifiers (LNA), a set of receiver front end phase shifters, and a set of power combiners) for the signal reception (not shown for brevity).

The transmitter circuitry 1318 may be configured to further forward the received one or more beams of RF signals carrying the one or more data streams to a destination network node (e.g. the second network node 110 or node B). The transmitter circuitry 1318 may be configured to control the one or more one or more transmitting antenna arrays 1320. In an example, transmitter circuitry 1318 may include a cascading transmitter chain comprising various components for baseband signal processing or digital signal processing.

In various embodiments, described, for example, in FIGS. 1 to 12, where the one or more receiving antenna arrays 1316 receives a signal and re-transmits the signal through the one or more transmitting antenna arrays 1320, additional processing/operation may be applied to the signal between the one or more receiving antenna arrays 1316 and the corresponding transmitting array of the one or more transmitting antenna arrays 1320. For example, the received signal may be: 1) frequency shifted to a frequency other than input carrier frequency, 2) passed through phase and gain adjustment, such as the gain and phase control operation 202 may be applied, 3) passed through low-pass or band-pass filtering, 4) digitized and processed in digital domain before re-transmission, or 5) digitized, de-modulated, re-modulated and re-transmitted.

Figure 14:
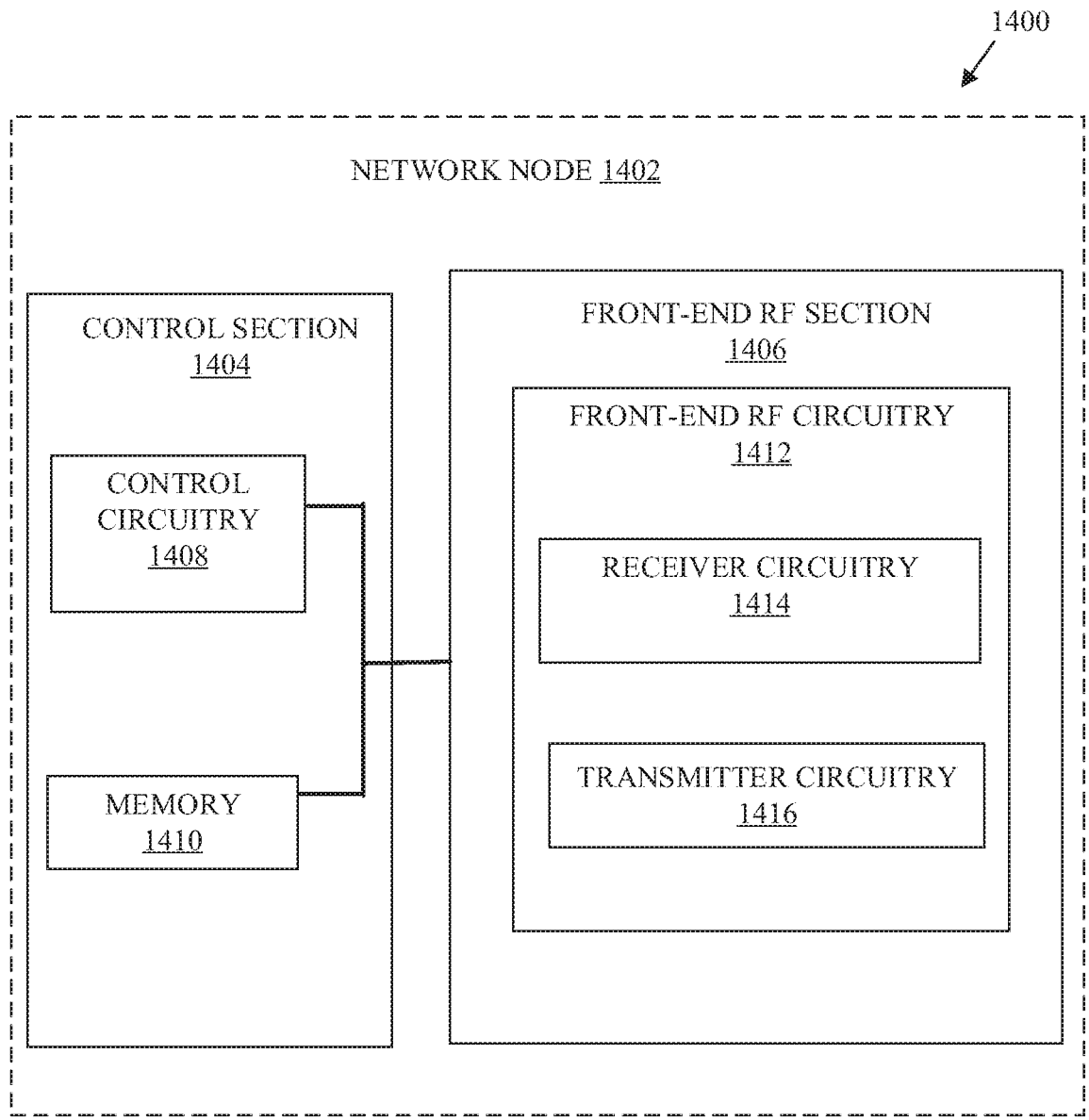
FIG. 14 is a block diagram illustrating various components of an exemplary network node, in accordance with an exemplary embodiment of the disclosure.

FIG. 14 is a block diagram illustrating various components of an exemplary network node, in accordance with an exemplary embodiment of the disclosure. FIG. 14 is explained in conjunction with elements from FIGS. 1 to 13. With reference to FIG. 14, there is shown a block diagram 1400 of a network node 1402. The network node 1402 may correspond to the first network node 108 or the second network node 110 (FIG. 1). The network node 1402 may include a control section 1404 and a front-end RF section 1406. The control section 1404 may include control circuitry 1408 and a memory 1410. The control section 1404 may be communicatively coupled to the front-end RF section 1406. The front-end RF section 1406 may include front-end RF circuitry 1412. The front-end RF circuitry 1412 may further include a receiver circuitry 1414 and a transmitter circuitry 1416. The front-end RF circuitry 1412 may further include one or more antenna or antenna arrays depending on implementation (not shown for the sake of brevity). Examples of the implementation of the control circuitry 1408, the memory 1410 may correspond to the examples of implementation of the control circuitry 1308 and the memory 1310, respectively.

The front-end RF circuitry 1412 includes the receiver circuitry 1414 and the transmitter circuitry 1416. The receiver circuitry 1414 may be configured to receive one or more beams/streams from one or more repeater devices, such as the repeater device 1302, or directly from another network nodes in a network. The front-end RF circuitry 1412 supports MIMO processing and operations, and may be configured to execute MIMO communication with the one or more repeater devices and end-user devices. The MIMO communication may be executed at a sub 6 gigahertz (GHz) frequency or mmWave frequency. The transmitter circuitry 1416 may be configured to transmit one or more beams of RF signals carrying one or more data streams to a destination network node (node B) via one or multiple communication paths through the one or more repeater devices of a repeater system (e.g. the repeater system 102, 302, 402, 502, 602, or 702).

Figure 15A:
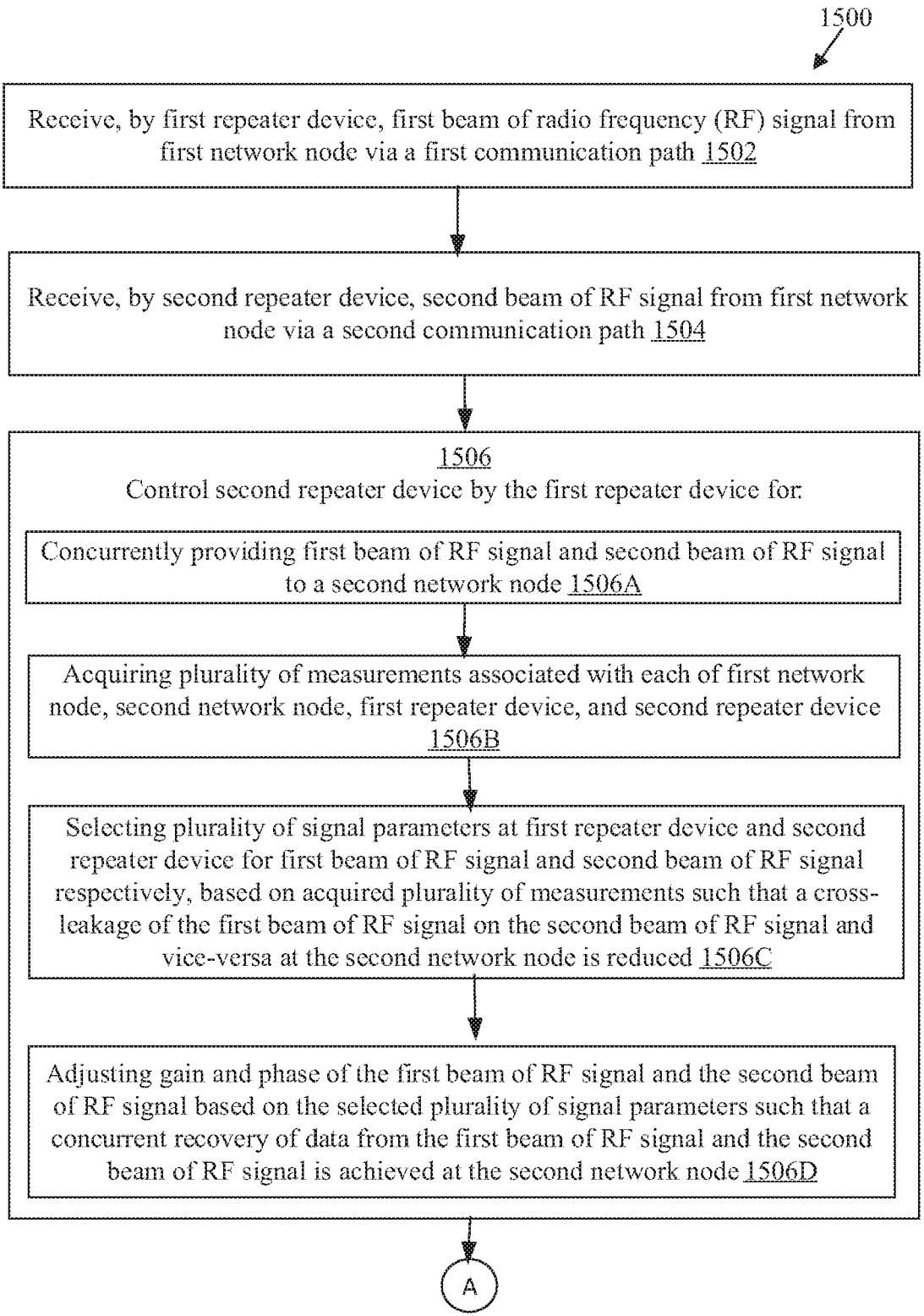
FIG. 15A and FIG. 15B, collectively, is a flowchart that illustrates a method for high performance communication, in accordance with an embodiment of the disclosure.
Figure 15B:
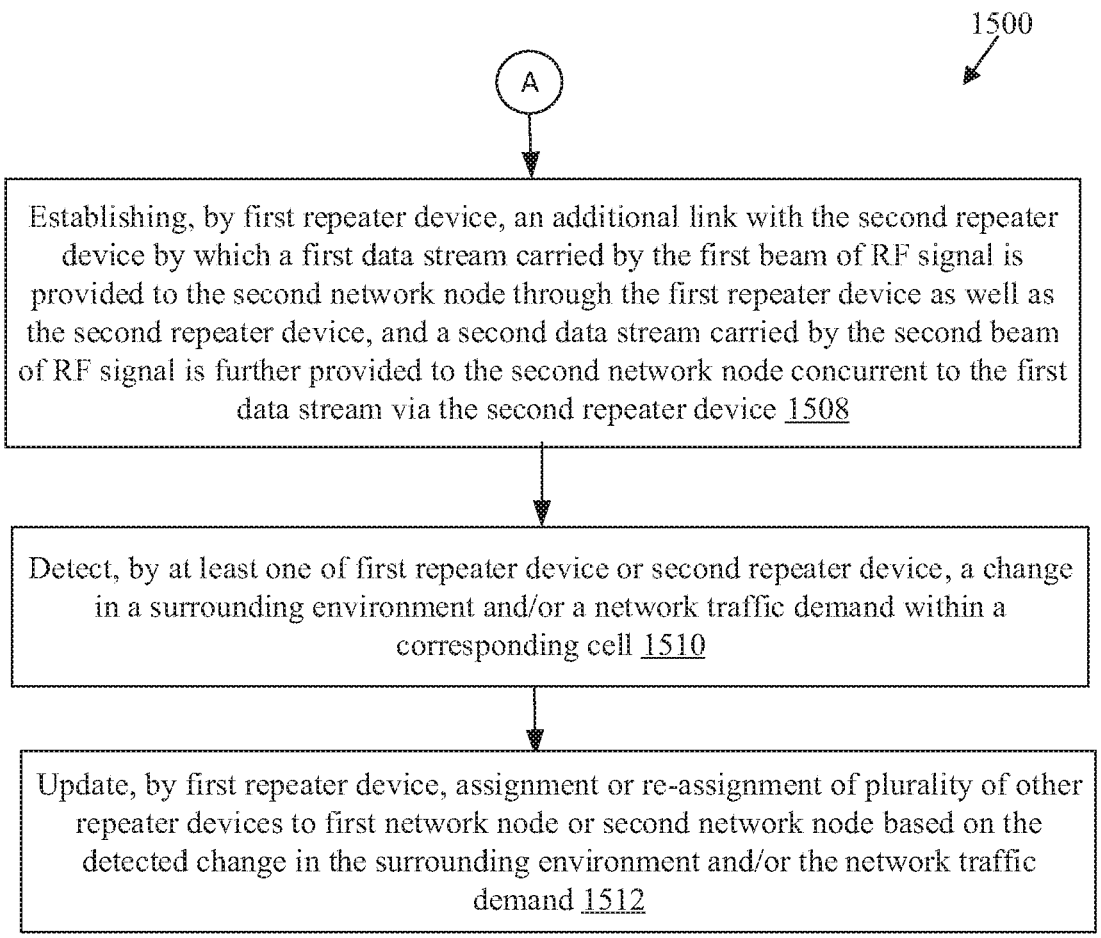

FIGS. 15A and 15B, collectively, is a flowchart that illustrates a method for high performance communication, in accordance with an embodiment of the disclosure. FIGS. 15A and 15B, are explained in conjunction with elements from FIGS. 1 to 14. With reference to FIGS. 15A and 15B, there is shown a flowchart 1500 comprising exemplary operations 1502 through 1512.

At 1502, a first beam of radio frequency (RF) signal may be received by the first repeater device 104 from the first network node 108 via a first communication path. At 1504, a second beam of RF signal may be received by the second repeater device 110 from the first network node 108 via a second communication path. At 1506, the second repeater device 106 may be controlled by the first repeater device 104 for executing various operations 1506A to 1506D. At 1506A, the first beam of RF signal and the second beam of RF signal may be concurrently provided to the second network node 110, by the first repeater device 104 and the second repeater device 106 of the repeater system 102. At 1506B, a plurality of measurements associated with each of the first network node 108, the second network node 110, the first repeater device 104, and the second repeater device 106, may be acquired. At 1506C, a plurality of signal parameters may be selected at the first repeater device 104 and the second repeater device 106 for the first beam of RF signal and the second beam of RF signal respectively, based on the acquired plurality of measurements such that a cross-leakage of the first beam of RF signal on the second beam of RF signal and vice-versa at the second network node 110 is reduced. At 1506D, a gain and a phase of the first beam of RF signal and the second beam of RF signal may be adjusted based on the selected plurality of signal parameters such that concurrent recovery of data from the first beam of RF signal and the second beam of RF signal is achieved at the second network node 110.

At 1508, an additional link (e.g. the additional link 708) may be established by the first repeater device 104 with the second repeater device 106 by which a first data stream carried by the first beam of RF signal is provided to the second network node 110 through the first repeater device 104 as well as the second repeater device 106, and a second data stream carried by the second beam of RF signal is further provided to the second network node 110 concurrent to the first data stream via the second repeater device 106. At 1510, a change in a surrounding environment and/or a network traffic demand within a corresponding cell may be detected by at least one of the first repeater device 104 or the second repeater device 106. At 1512, an assignment or a re-assignment of a plurality of other repeater devices to the first network node 108 or the second network node 110 may be updated by the first repeater device 104 based on the detected change in the surrounding environment and/or the network traffic demand.

Various embodiments of the disclosure may provide a non-transitory computer-readable medium having stored thereon, computer implemented instructions that when executed by a computer causes a communication apparatus to execute operations as disclosed herein. Exemplary operations may comprise receiving, by the first repeater device 104 of the repeater system 102, a first beam of radio frequency (RF) signal from the first network node 108 via a first communication path. The second repeater device 106 of the repeater system 102 may receive a second beam of RF signal from the first network node 108 via a second communication path. The first repeater device 104 may be control the second repeater device 106 to: concurrently provide the first beam of RF signal and the second beam of RF signal to the second network node 110; acquire a plurality of measurements associated with each of the first network node 108, the second network node 110, the first repeater device 104, and the second repeater device 106; select a plurality of signal parameters at the first repeater device 104 and the second repeater device 106 for the first beam of RF signal and the second beam of RF signal respectively, based on the acquired plurality of measurements such that a cross-leakage of the first beam of RF signal on the second beam of RF signal and vice-versa at the second network node 110 is reduced; and adjust a gain and a phase of the first beam of RF signal and the second beam of RF signal based on the selected plurality of signal parameters such that a concurrent recovery of data from the first beam of RF signal and the second beam of RF signal is achieved at the second network node 110.

Various embodiments of the disclosure may include a repeater system, for example, the repeater system 102 302, 402, 502, 602, or 702 (FIGS. 1 to 7). The repeater system includes the first repeater device 104 configured to receive a first beam of radio frequency (RF) signal from a first network node 108 via a first communication path. The repeater system further includes the second repeater device 106 configured to receive a second beam of RF signal from the first network node 108 via a second communication path, where the first repeater device 104 is a master repeater device, and may be configured to synchronize and control the second repeater device 106 to: concurrently provide the first beam of RF signal and the second beam of RF signal to the second network node 110; acquire a plurality of measurements associated with each of the first network node 108, the second network node 110, the first repeater device 104, and the second repeater device 106; select a plurality of signal parameters at the first repeater device 104 and the second repeater device 106 for the first beam of RF signal and the second beam of RF signal respectively, based on the acquired plurality of measurements such that a cross-leakage of the first beam of RF signal on the second beam of RF signal and vice-versa at the second network node 110 is reduced; and adjust a gain and a phase of the first beam of RF signal and the second beam of RF signal based on the selected plurality of signal parameters such that a concurrent recovery of data from the first beam of RF signal and the second beam of RF signal is achieved at the second network node 110.

In accordance with an embodiment, the plurality of measurements comprises a signal-to-noise ratio (SNR) of the first beam of RF signal and the second beam of RF signal at the second network node 110, a channel impulse response corresponding to the first beam of RF signal and the second beam of RF signal at the second network node 110, a cross-leakage between the first beam of RF signal and the second beam of RF signal measured at the second network node 110, an absolute signal power corresponding to the first beam of RF signal and the second beam of RF signal at the second network node 110, required SNR values depending on a modulation-coding-scheme used for the first beam of RF signal and the second beam of RF signal, a first SNR value for the first beam of RF signal received at the first repeater device 104, and a second SNR value for second beam of RF signal received at the second repeater device 106.

In accordance with an embodiment, the plurality of measurements may be acquired based on in-band communication between the first repeater device 104 and each of the first network node 108, the second network node 110 110, and the second repeater device 106. In accordance with another embodiment, the plurality of measurements may be acquired based on out-of-band communication between the first repeater device 104 and each of the first network node 108, the second network node 110 110, and the second repeater device 106. The first beam RF signal carry a first data stream and the second beam RF signal carry a second data stream, and wherein the first data stream and the second data stream are identical. In another implementation, the first beam RF signal carry a first data stream and the second beam RF signal carry a second data stream, and wherein the first data stream is different from the second data stream.

In accordance with an embodiment, the first beam of RF signal carrying a first data stream is received from the first network node 108 in a first polarization type and re-transmitted to the second network node 110 in a second polarization type that is different than the first polarization type. The second beam of RF signal carrying a second data stream is received from the first network node 108 in a first polarization type and re-transmitted to the second network node 110 in a second polarization type that is different than the first polarization type.

In accordance with an embodiment, the first repeater device 104 may be further configured to establish the additional link 708 with the second repeater device 106 by which a first data stream carried by the first beam of RF signal is provided to the second network node 110 through the first repeater device 104 as well as the second repeater device 106, and a second data stream carried by the second beam of RF signal is further provided to the second network node 110 concurrent to the first data stream via the second repeater device 106.

In accordance with an embodiment, the first repeater device 104 and the second repeater device 106 are mounted on the vehicle 802, and wherein the first repeater device 104 in synchronization to the second repeater device 106 may be further configured to select one or more beamforming schemes to illuminate space inside the vehicle 802 such that both an uplink and a downlink communication is established between the first network node 108 and a user device corresponding to the second network node present within the vehicle 802. The first repeater device 104 and the second repeater device 106 may be mounted on the vehicle 802, and where at least one of the first repeater device 104 and the second repeater device 106 may be further configured to be activated or deactivated based on a visibility status to the first network node 108 when the vehicle 802 in in motion.

In accordance with an embodiment, each of the first repeater device 104 and the second repeater device 106 may be further configured to determine a plurality of criteria when the vehicle 802 in in motion, and where one of the first repeater device 104 and the second repeater device 106 may be activated or deactivated based on the determined plurality of criteria when the vehicle 802 in in motion. The first repeater device 104 and the second repeater device 106 may be further configured to detect a change in the surrounding environment and/or a network traffic demand within a corresponding cell. The first repeater device 104 is further configured to update an assignment or a re-assignment of a plurality of other repeater devices to the first network node 108 or the second network node 110 based on the detected change in the surrounding environment and/or the network traffic demand.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A repeater system, comprising:
a first repeater device configured to receive a first beam of radio frequency (RF) signal from a first network node via a first communication path;
a second repeater device configured to receive a second beam of RF signal from the first network node via a second communication path,
wherein the first repeater device is a master repeater device, and is configured to synchronize and control the second repeater device to:
concurrently provide the first beam of RF signal and the second beam of RF signal to a second network node;
acquire a plurality of measurements associated with each of the first network node, the second network node, the first repeater device, and the second repeater device;
select a plurality of signal parameters at the first repeater device and the second repeater device for the first beam of RF signal and the second beam of RF signal respectively, based on the acquired plurality of measurements such that a cross-leakage of the first beam of RF signal on the second beam of RF signal and vice-versa at the second network node is reduced; and
adjust a gain and a phase of the first beam of RF signal and the second beam of RF signal based on the selected plurality of signal parameters such that a concurrent recovery of data from the first beam of RF signal and the second beam of RF signal is achieved at the second network node.

2. The repeater system according to claim 1, wherein the plurality of measurements comprises a signal-to-noise ratio (SNR) of the first beam of RF signal and the second beam of RF signal at the second network node, a channel impulse response corresponding to the first beam of RF signal and the second beam of RF signal at the second network node, a cross-leakage between the first beam of RF signal and the second beam of RF signal measured at the second network node, an absolute signal power corresponding to the first beam of RF signal and the second beam of RF signal at the second network node, required SNR values depending on a modulation-coding-scheme used for the first beam of RF signal and the second beam of RF signal, a first SNR value for the first beam of RF signal received at the first repeater device, and a second SNR value for second beam of RF signal received at the second repeater device.

3. The repeater system according to claim 1, wherein the plurality of measurements are acquired based on in-band communication between the first repeater device and each of the first network node, the second network node, and the second repeater device.

4. The repeater system according to claim 1, wherein the plurality of measurements are acquired based on out-of-band communication between the first repeater device and each of the first network node, the second network node, and the second repeater device.

5. The repeater system according to claim 1, wherein the first beam RF signal carry a first data stream and the second beam RF signal carry a second data stream, and wherein the first data stream and the second data stream are identical.

6. The repeater system according to claim 1, wherein the first beam RF signal carry a first data stream and the second beam RF signal carry a second data stream, and wherein the first data stream is different from the second data stream.

7. The repeater system according to claim 1, wherein the first beam of RF signal carrying a first data stream is received from the first network node in a first polarization type and re-transmitted to the second network node in a second polarization type that is different than the first polarization type.

8. The repeater system according to claim 1, wherein the second beam of RF signal carrying a second data stream is received from the first network node in a first polarization type and re-transmitted to the second network node in a second polarization type that is different than the first polarization type.

9. The repeater system according to claim 1, wherein the first repeater device is further configured to establish an additional link with the second repeater device by which a first data stream carried by the first beam of RF signal is provided to the second network node through the first repeater device as well as the second repeater device, and a second data stream carried by the second beam of RF signal is further provided to the second network node concurrent to the first data stream via the second repeater device.

10. The repeater system according to claim 1, wherein the first repeater device comprises a first receiving antenna array and a first transmitting antenna array, and wherein the second repeater device comprises a second receiving antenna array and a second transmitting antenna array.

11. The repeater system according to claim 1, wherein the first repeater device and the second repeater device are mounted on a vehicle, and wherein the first repeater device in synchronization to the second repeater device are configured to select one or more beamforming schemes to illuminate space inside the vehicle such that both an uplink and a downlink communication is established between the first network node and a user device corresponding to a second communication node within the vehicle.

12. The repeater system according to claim 11, wherein the first repeater device and the second repeater device are mounted on a vehicle, and wherein at least one of the first repeater device and the second repeater device is further configured to be activated or deactivated based on a visibility status to the first network node when the vehicle in in motion.

13. The repeater system according to claim 12, wherein each of the first repeater device and the second repeater device is further configured to determine a plurality of criteria when the vehicle in in motion, and wherein one of the first repeater device and the second repeater device is activated or deactivated based on the determined plurality of criteria when the vehicle in in motion.

14. The repeater system according to claim 1, wherein each of the first repeater device and the second repeater device is further configured to detect a change in a surrounding environment and/or a network traffic demand within a corresponding cell, wherein the first repeater device is further configured to update an assignment or a re-assignment of a plurality of other repeater devices to the first network node or the second network node based on the detected change in the surrounding environment and/or the network traffic demand.

15. A method implemented in a repeater system, the method comprising:
receiving, by a first repeater device of the repeater system, a first beam of radio frequency (RF) signal from a first network node via a first communication path;
receiving, by a second repeater device of the repeater system, a second beam of RF signal from the first network node via a second communication path; and
controlling, by the first repeater device, the second repeater device for:
concurrently providing the first beam of RF signal and the second beam of RF signal to a second network node;
acquiring a plurality of measurements associated with each of the first network node, the second network node, the first repeater device, and the second repeater device;
selecting a plurality of signal parameters at the first repeater device and the second repeater device for the first beam of RF signal and the second beam of RF signal respectively, based on the acquired plurality of measurements such that a cross-leakage of the first beam of RF signal on the second beam of RF signal and vice-versa at the second network node is reduced; and
adjusting a gain and a phase of the first beam of RF signal and the second beam of RF signal based on the selected plurality of signal parameters such that a concurrent recovery of data from the first beam of RF signal and the second beam of RF signal is achieved at the second network node.

16. The method according to claim 15, wherein the first beam RF signal carry a first data stream and the second beam RF signal carry a second data stream, and wherein the first data stream and the second data stream are identical.

17. The method according to claim 15, wherein the first beam RF signal carry a first data stream and the second beam RF signal carry a second data stream, and wherein the first data stream is different from the second data stream.

18. The method according to claim 15, further comprising establishing, by the first repeater device, an additional link with the second repeater device by which a first data stream carried by the first beam of RF signal is provided to the second network node through the first repeater device as well as the second repeater device, and a second data stream carried by the second beam of RF signal is further provided to the second network node concurrent to the first data stream via the second repeater device.

19. The method according to claim 15, further comprising:
detecting, by at least one of the first repeater device or the second repeater device, a change in a surrounding environment and/or a network traffic demand within a corresponding cell; and
updating, by the first repeater device, an assignment or a re-assignment of a plurality of other repeater devices to the first network node or the second network node based on the detected change in the surrounding environment and/or the network traffic demand.

20. A non-transitory computer-readable medium having stored thereon, computer implemented instructions that when executed by a computer in a communication apparatus causes the communication apparatus to execute operations, the operations comprising:
receiving a first beam of radio frequency (RF) signal from a first network node via a first communication path;
receiving a second beam of RF signal from the first network node via a second communication path;
concurrently providing the first beam of RF signal and the second beam of RF signal to a second network node;
acquiring a plurality of measurements associated with each of the first network node, the second network node, a first repeater device, and a second repeater device;
selecting a plurality of signal parameters at the first repeater device and the second repeater device for the first beam of RF signal and the second beam of RF signal respectively, based on the acquired plurality of measurements such that a cross-leakage of the first beam of RF signal on the second beam of RF signal and vice-versa at the second network node is reduced; and
adjusting a gain and a phase of the first beam of RF signal and the second beam of RF signal based on the selected plurality of signal parameters such that a concurrent recovery of data from the first beam of RF signal and the second beam of RF signal is achieved at the second network node.

\* \* \* \* \*